United States Patent
Nakajima

(10) Patent No.: US 8,660,344 B2
(45) Date of Patent: Feb. 25, 2014

(54) IMAGE PROCESSING APPARATUS, IMAGE PROCESSING METHOD, AND RECORDING MEDIUM

(75) Inventor: Mitsuyasu Nakajima, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 151 days.

(21) Appl. No.: 13/333,048

(22) Filed: Dec. 21, 2011

(65) Prior Publication Data

US 2012/0163712 A1    Jun. 28, 2012

(30) Foreign Application Priority Data

Dec. 22, 2010   (JP) ................................. 2010-285315

(51) Int. Cl.
*G06K 9/00*    (2006.01)

(52) U.S. Cl.
USPC ........................................................ 382/165

(58) Field of Classification Search
USPC ......... 382/100, 103, 110–113, 162, 164–165, 382/173, 176, 180–181, 190, 218–222, 382/236; 348/208.1, 208.14, 352, 348/401.1–402.1, 407.1, 409.1–418.1, 348/430.1–431.1; 358/538, 453, 464
See application file for complete search history.

(56) References Cited

U.S. PATENT DOCUMENTS

| | | | |
|---|---|---|---|
| 6,141,433 A * | 10/2000 | Moed et al. | 382/103 |
| 6,973,212 B2 | 12/2005 | Baykov et al. | |
| 8,018,494 B2 * | 9/2011 | Yokomitsu et al. | 348/208.14 |
| 8,326,029 B1 * | 12/2012 | Obrador | 382/164 |

FOREIGN PATENT DOCUMENTS

JP    2006-350553 A    12/2006

OTHER PUBLICATIONS

Japanese Office Action dated Oct. 2, 2012 (and English translation thereof) in counterpart Japanese Application No. 2010-285315.
Ken Matsuo: "A non-interactive image segmentation method based on the shape similarity of the Grabcut": IPSJ SIG Technical Report fiscal year 2009 6: IPSJ SIG Technical Report Computer Vision and Image Media (CVIM), No. 171: Information Processing Society of Japan: Apr. 15, 2010: pp. 1-8: Japan Conference Paper 2010-00530-018.

* cited by examiner

*Primary Examiner* — Jose Couso
(74) *Attorney, Agent, or Firm* — Holtz, Holtz, Goodman & Chick, PC

(57) ABSTRACT

An image processing apparatus includes: an obtaining section which obtains a subject existing image in which a subject and a background exist; a first specification section which specifies a plurality of image regions in the subject existing image; a comparison section which compares a representative color of each of the image regions with a predetermined color; a generation section which generates an extraction-use background color based on a comparison result of the comparison section; and a second specification section which specifies a subject constituent region constituting the subject and a background constituent region constituting the background in the subject existing image based on the extraction-use background color.

13 Claims, 16 Drawing Sheets

IMAGE PROCESSING APPARATUS, IMAGE PROCESSING METHOD, AND RECORDING MEDIUM

BACKGROUND OF THE INVENTION

1. Field of the Invention

The present invention relates to an image processing apparatus, an image processing method, and a recording medium.

2. Description of the Related Art

Conventionally, there is known a method of obtaining a parameter to minimize an energy function, such as a graph cut algorithm, in order to extract a subject region which includes a subject from an image in which both the subject and the background exist, as disclosed by U.S. Pat. No. 6,973,212.

In the method disclosed by U.S. Pat. No. 6,973,212, the likelihood of the subject (subject likelihood) and the likelihood of the background (background likelihood) of an unsettled region, which is undecided to be the subject region or a background region, are calculated based on a correct region (seed) constituting the subject and a correct region (seed) constituting the background, and for that, it is necessary to specify the correct seeds beforehand based on predetermined user's operations on an operation section.

BRIEF SUMMARY OF THE INVENTION

Objects of the present invention are to provide an image processing apparatus, an image processing method, and a recording medium which automatically specify a subject constituent region and a background constituent region in a subject existing image.

According to an embodiment of the present invention, there is provided an image processing apparatus including: an obtaining section which obtains a subject existing image in which a subject and a background exist; a first specification section which specifies a plurality of image regions in the subject existing image; a comparison section which compares a representative color of each of the image regions with a predetermined color; a generation section which generates an extraction-use background color based on a comparison result of the comparison section; and a second specification section which specifies a subject constituent region constituting the subject and a background constituent region constituting the background in the subject existing image based on the extraction-use background color.

According to an embodiment of the present invention, there is provided an image processing method using an image processing apparatus, the image processing method including: obtaining a subject existing image in which a subject and a background exist; specifying a plurality of image regions in the obtained subject existing image; comparing a representative color of each of the specified image regions with a predetermined color; generating an extraction-use background color based on a comparison result of the comparison; and specifying a subject constituent region constituting the subject and a background constituent region constituting the background in the subject existing image based on the generated extraction-use background color.

According to an embodiment of the present invention, there is provided a recording medium recording a program for allowing an image processing apparatus of a computer to function as: an obtaining section which obtains a subject existing image in which a subject and a background exist; a first specification section which specifies a plurality of image regions in the subject existing image; a comparison section which compares a representative color of each of the image regions with a predetermined color; a generation section which generates an extraction-use background color based on a comparison result of the comparison section; and a second specification section which specifies a subject constituent region constituting the subject and a background constituent region constituting the background in the subject existing image based on the extraction-use background color.

DETAILED DESCRIPTION OF THE INVENTION

In the following, embodiments are described in detail with reference to the accompanying drawing. However, the scope of the present invention is not limited to the embodiments.

First Embodiment

Figure 1:
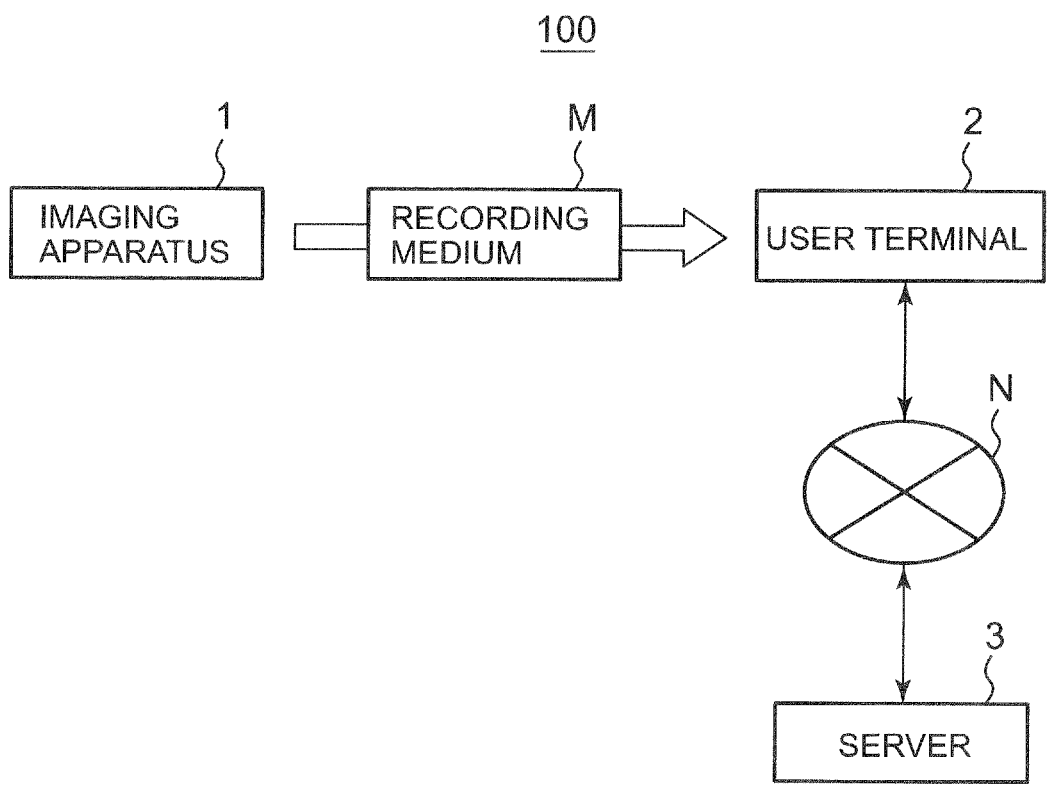
FIG. 1 is a block diagram schematically showing the configuration of a subject cutout system according to a first embodiment of the present invention.

FIG. 1 is a block diagram schematically showing the configuration of a subject cutout system 100 according to a first embodiment of the present invention.

As shown in FIG. 1, the subject cutout system 100 of the first embodiment includes an imaging apparatus 1, a user terminal 2, and a server 3. The user terminal 2 and the server 3 are connected with each other via a predetermined communication network N so as to transmit/receive various pieces of information with each other.

First, the imaging apparatus 1 is described with reference to FIG. 2.

Figure 2:
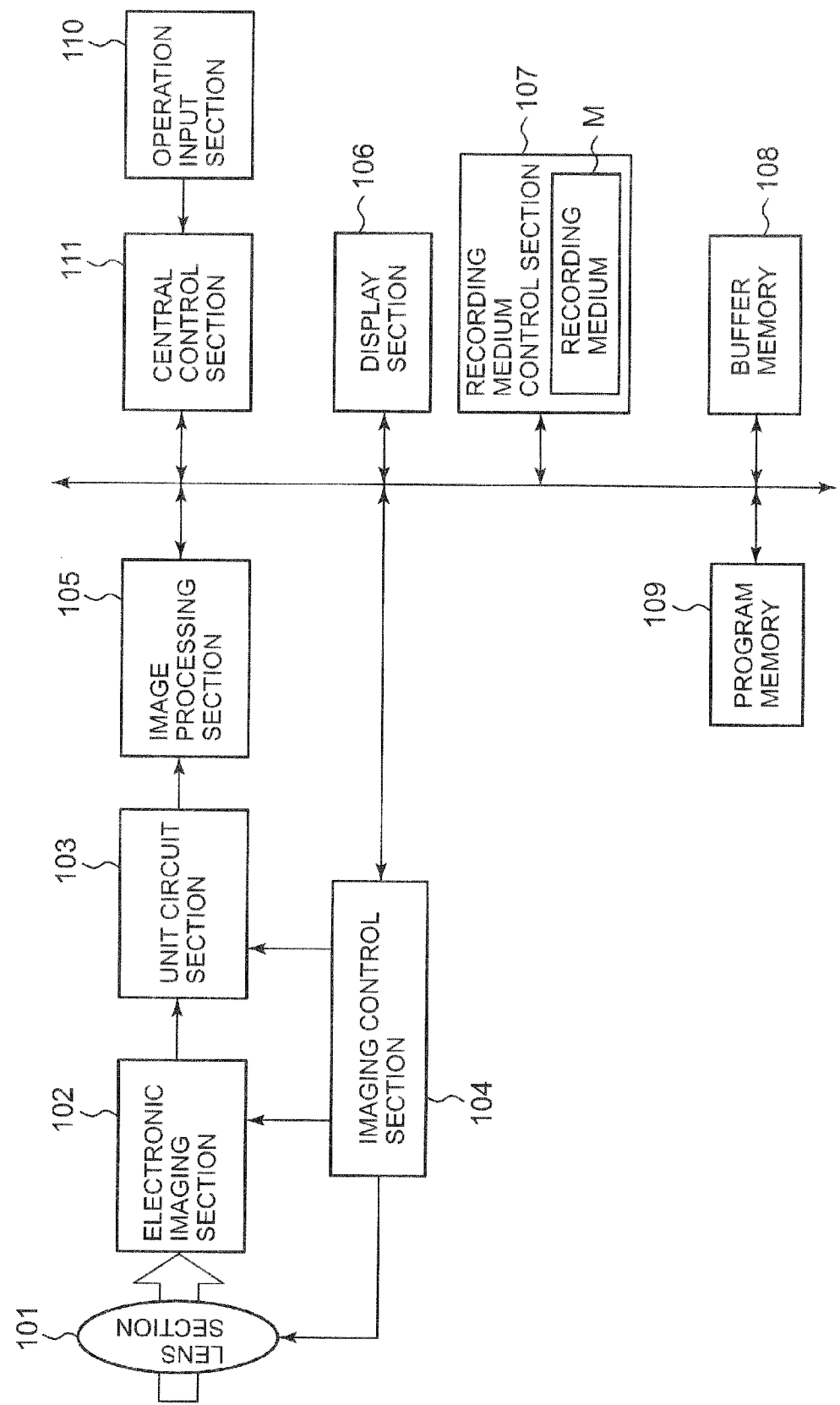
FIG. 2 is a block diagram schematically showing the configuration of an imaging apparatus of the subject cutout system.

FIG. 2 is a block diagram schematically showing the configuration of the imaging apparatus 1.

As shown in FIG. 2, the imaging apparatus 1 includes a lens section 101, an electronic imaging section 102, a unit circuit section 103, an imaging control section 104, an image processing section 105, a display section 106, a recording medium control section 107, a buffer memory 108, a program memory 109, an operation input section 110, and a central control section 111.

The lens section 101 includes, for example, a zoom lens, a focus lens, and an aperture (all not shown), and combines optical images of a subject, the optical images which pass through these lenses.

The electronic imaging section 102 is composed of, for example, an image sensor such as a CCD (Charge Coupled Device) or a CMOS (Complementary Metal-oxide Semiconductor). The electronic imaging section 102 converts the optical images which pass through the lenses of the lens section 101 into two-dimensional image signals (RGB image data), and outputs the image signals to the unit circuit section 103.

The unit circuit section 103 includes a CDS (Correlated Double Sampling) circuit, an AGC (Auto Gain Control) amplifier, and an ADC (Analog to Digital Converter) (all not shown). The unit circuit section 103 holds analog image signals corresponding to the optical images of the subject with the CDS circuit, the analog image signals which are outputted and inputted from the electronic imaging section 102, amplifies the image signals with the AGC amplifier, and then converts the amplified image signals into digital image signals with the ADC.

The imaging control section 104 controls, when an image of a subject is taken, operations of the lens section 101, the electronic imaging section 102, the unit circuit section 103, and the like based on commands from the central control section 111. More specifically, the imaging control section 104 controls drive of a lens motor (not shown) for moving the zoom lens or the focus lens of the lens section 101 on an optical axis, controls driving timing at which the electronic imaging section 102 is driven to perform scanning, and controls driving timing of the unit circuit section 103 based on the driving timing of the electronic imaging section 102.

The image processing unit 105 performs RGB interpolation by which data of R, G, and B color components (RGB data) for each pixel is generated, YUV conversion by which YUV data composed of a brightness signal (Y) and color difference signals (U and V) is generated from the RGB data for each pixel, and digital signal processing such as auto white balance or edge enhancement to improve the image quality. The image processing section 105 successively outputs the converted YUV data for each image frame to the buffer memory 108, and stores the data in the buffer memory 108.

After converting the YUV data for one frame stored in the buffer memory 108 into video signals, the display section 106 displays the video signals on a display screen thereof as a live view image. More specifically, the display section 106 displays the live view image at a predetermined display frame rate based on a plurality of image frames generated by taking images of a subject, or displays a rec-view image taken as a final image.

Figure 8A:
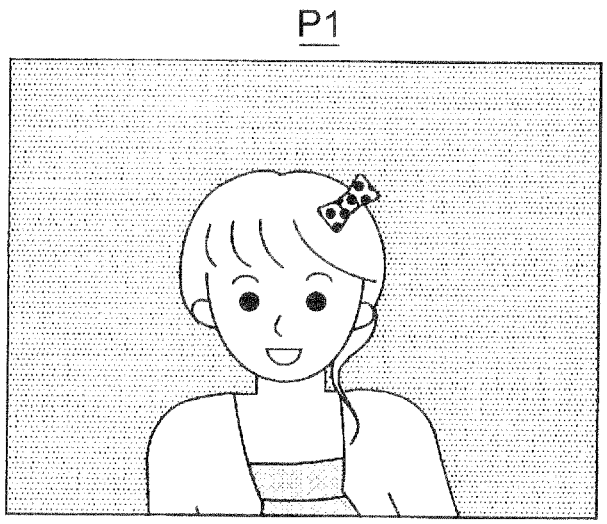
FIGS. 8A to 8C schematically show images in the background generation processing shown in FIG. 7.

The recording medium control section 107 is configured in such a way that a recording medium M is detachable. The recording medium control section 107 controls reading of data from the attached recording medium M, and writing of data on the recording medium M. That is, the recording medium control section 107 records image data for recording of a taken image encoded by a JPEG compression section (not shown) of the image processing section 105 on the recording medium M. More specifically, the recording medium control section 107 records the image data for recording of a subject existing image P1 (shown in FIG. 8A) in which a background and a subject exist on the recording medium M.

The recording medium M is composed of, for example, a nonvolatile memory (flash memory) or the like. However, this is not a limit but an example, and hence the recording medium M may be composed of another element as needed.

The buffer memory 108 is a buffer to temporarily store image data and the like, and also used as a working memory or the like of the central control section 111 or the like.

The program memory 109 stores various programs for the functions of the imaging apparatus 1, the data therefor, and the like. The program memory 109 also stores; for example, program AE (Automatic Exposure) data constituting a program chart which shows combinations between f numbers (F) and shutter speeds for proper exposure values (EV) for the time of taking still images, performing continuous shooting, taking live view images, and the like; an EV table (both not shown); and the like.

The operation input section 110 is for performing predetermined operations of the imaging apparatus 1. More specifically, the operation input section 110 includes a shutter button for inputting image instructions to take images of a subject, a selection determination button for inputting selection instructions to select imaging modes and functions, and a zoom button for inputting adjustment instructions to adjust the amount of zoom (all not shown). In response to user's operations of these buttons, predetermined operation signals are outputted to the central control section 111.

The central control section 111 is composed of, for example, a one-chip microcomputer including a CPU which controls the components of the imaging apparatus 1.

The central control section 111 controls the components of the imaging apparatus 1 based on the operation signals outputted and inputted from the operation input section 110. More specifically, when a recording instruction signal outputted in response to a predetermined operation of the shutter button of the operation input section 110 is inputted into the central control section 111, the central control section 111 controls the driving timing of the electronic imaging section 102 and the driving timing of the unit circuit section 103 with the imaging control section 104 in accordance with a predetermined program stored in the program memory 109 so as to take a still image. The YUV data for one frame stored in the buffer memory 108 by taking the still image is compressed and encoded by the image processing section 105 using a JPEG method or the like, and recorded as still image data on the recording medium M.

Next, the user terminal 2 is described with reference to FIG. 3.

The user terminal 2 is composed of, for example, a personal computer or the like. The user terminal 2 accesses a web page (subject extraction page, for example) opened by the server 3, and transmits image data of the subject existing image P1 to the server 3.

Figure 3:
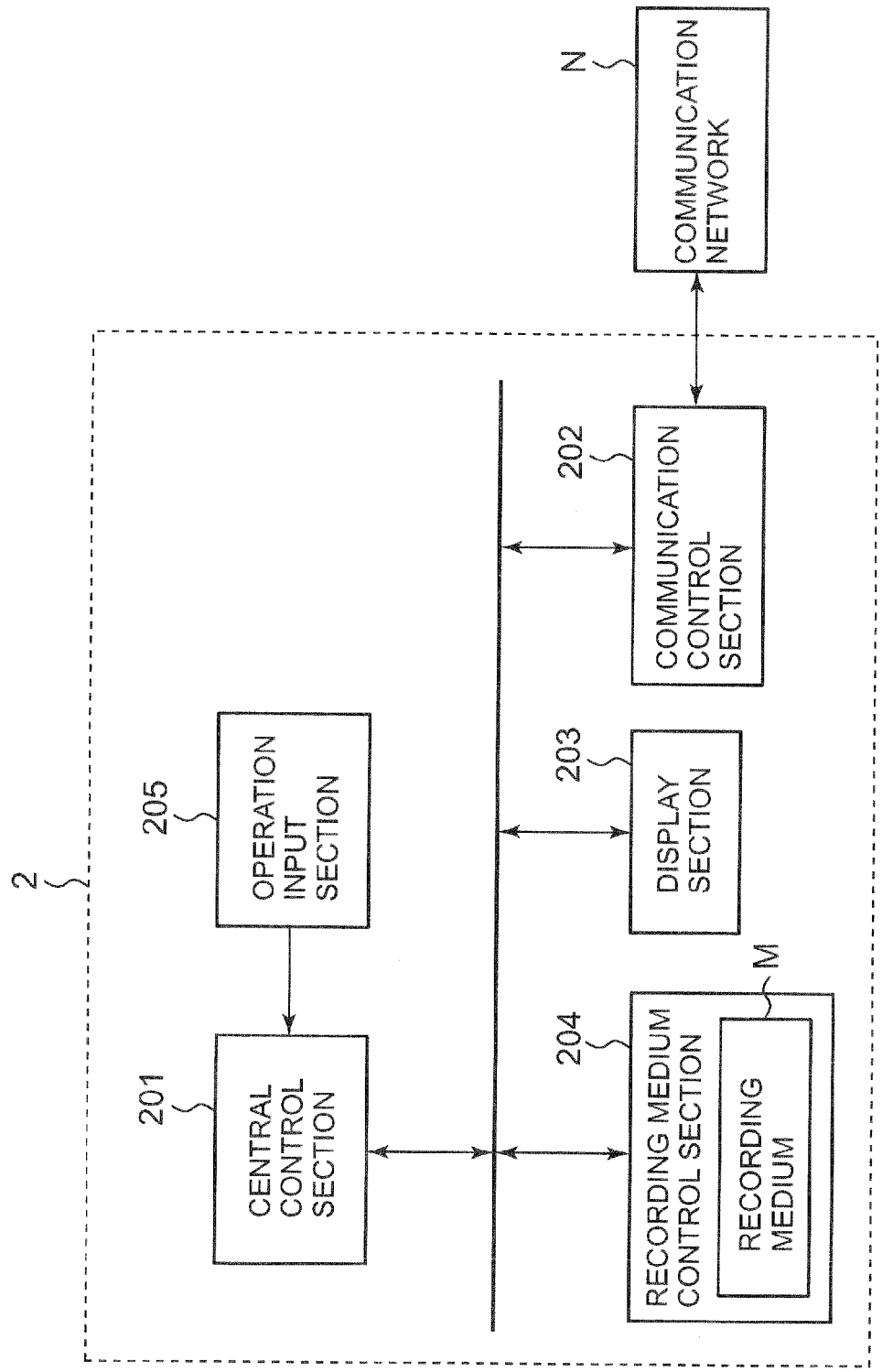
FIG. 3 is a block diagram schematically showing the configuration of a user terminal of the subject cutout system.

FIG. 3 is a block diagram schematically showing the configuration of the user terminal 2.

As shown in FIG. 3, the user terminal 2 includes a central control section 201, a communication control section 202, a display section 203, a recording medium control section 204, and an operation input section 205.

The central control section 201 controls the components of the user terminal 2. More specifically, the central control section 201 includes a CPU, a RAM, and a ROM (all not shown), and performs various control operations in accordance with various processing programs (not shown) for the user terminal 2 stored in the ROM. The CPU stores various processing results in a storage region in the RAM, and displays the processing results on the display section 203 as needed.

The RAM includes, for example, a program storage region to expand the processing programs and the like to be executed by the CPU, and a data storage region to store inputted data, the processing results produced when the processing programs are executed, and the like.

The ROM stores programs stored in a form of program codes readable by a computer. More specifically, the ROM stores a system program executable by the user terminal 2, various processing programs executable by the system program, data used when the various processing programs are executed, and the like.

The communication control section 202 is composed of, for example, a modem (MOdulator/DEModulator), a terminal adapter, or the like. The communication control section 202 controls communications with an external apparatus such as the server 3 connected via a predetermined communication network N so as to transmit/receive information to/from the server 3.

The communication network N is constructed, for example, by using a leased line or a traditional normal public line, and various forms of lines such as a LAN (Local Area Network) and a WAN (Wide Area Network) can be applied thereto. Furthermore, the communication network N includes: various communication networks such as a telephone line network, an ISDN line network, a leased line network, a mobile communication network, a communications satellite line network, and a CATV line network; and an internet service provider by which these networks are connected.

The display section 203 is composed of a display such as an LCD or a CRT (Cathode Ray Tube). The display section 203 displays various pieces of information on a display screen thereof under the control of the CPU of the central control section 201.

More specifically, the display section 203 displays a web page (subject extraction page, for example) on the display screen thereof transmitted from the server 3 and received by the communication control section 202, based on the page data thereof.

The recording medium control section 204 is configured in such a way that the recording medium M is detachable. The recording medium control section 204 controls reading of data from the attached recording medium M and writing of data on the recording medium M. That is, the recording medium control section 204 reads the image data of the subject existing image P1 for subject image generation processing (described below) from the recording medium M which is detached from the imaging apparatus 1 and attached to the recording medium control section 204, and outputs the image data thereof to the communication control section 202.

Then, the communication control section 202 transmits the inputted image data of the subject existing image P1 to the server 3 via the predetermined communication network N.

The operation input section 205 includes a keyboard composed of, for example, data input keys for inputting numbers, characters, and the like, up, down, right, and left movement keys for data selection, sending operations, and the like, and various function keys, and a mouse. The operation input section 205 outputs depression signals of the keys depressed by a user and operation signals of the mouse to the CPU of the central control section 201.

Next, the server 3 is described with reference to FIG. 4.

The server 3 has a function to open a web page (subject extraction page, for example) on the Internet as a web (World Wide Web) server 3. Furthermore, when accessed by the user terminal 2, the server 3 transmits page data of the web page to the user terminal 2. Also, the server 3 as an image processing apparatus calculates a similarity between a color of each of image regions A of the subject existing image P1 and a predetermined one color, the subject existing image P1 in which the subject and the background coexist, and generates an extraction-use background color for extracting a subject region D which includes the subject from the subject existing image P1 based on the calculated similarity. In the embodiment, the server 3 generates an extraction-use background image P4 (shown in FIG. 9D) which is an image composed of the extraction-use background color. The server 3 specifies a subject constituent region Cs which constitutes the subject and a background constituent region Cb which constitutes the background in the subject existing image P1 based on the generated extraction-use background image P4.

Figure 4:
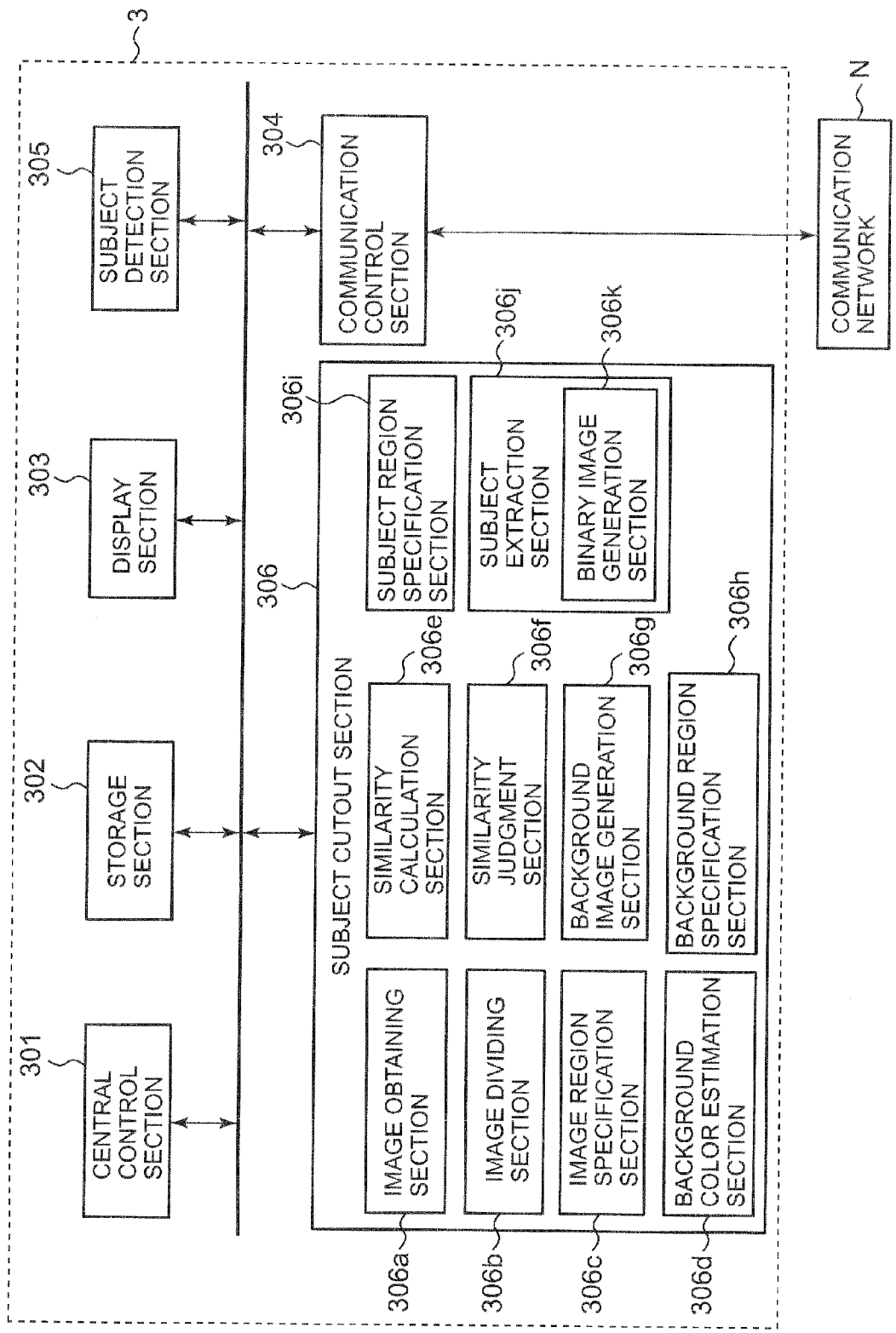
FIG. 4 is a block diagram schematically showing the configuration of a server of the subject cutout system.

FIG. 4 is a block diagram schematically showing the configuration of the server 3.

As shown in FIG. 4, the server 3 includes a central control section 301, a storage section 302, a display section 303, a communication control section 304, a subject detection section 305, and a subject cutout section 306.

The central control section 301 controls the components of the server 3. More specifically, the central control section 301 includes a CPU, a RAM, and a ROM (all not shown), and the CPU performs various control operations in accordance with various processing programs (not shown) for the server 3 stored in the ROM. The CPU stores various processing results in a storage region in the RAM, and displays the processing results on the display section 303 as needed.

The RAM includes, for example, a program storage region to expand the processing programs and the like to be executed by the CPU, and a data storage region to store inputted data, the processing results produced when the processing programs are executed, and the like.

The ROM stores programs stored in a form of program codes readable by a computer. More specifically, the ROM stores a system program executable by the server 3, various processing programs executable by the system program, data used when the various processing programs are executed, and the like.

The storage section 302 is composed of, for example, a nonvolatile semiconductor memory or an HHD (Hard Disc Drive). The storage section 302 stores, for example, the page data of the web page, which is transmitted to the user terminal 2.

The display section 303 is composed of, for example, a display such as an LCD or a CRT. The display section 303 displays various pieces of information on a display screen thereof under the control of the CPU of the central control section 301.

The communication control section 304 is composed of, for example, a modem, a terminal adapter, or the like. The communication control section 304 controls communications with an external apparatus such as the user terminal 2 connected via a predetermined communication network N so as to transmit/receive information to/from the user terminal 2.

The subject detection section 305 detects a certain subject from the subject existing image P1.

That is, the subject detection section 305 obtains image data (YUV data) of the subject existing image P1 transmitted from the user terminal 2 and received by the communication control section 304 via the predetermined communication network N. The subject detection section 305 performs various kinds of image processing on the image data, such as face detection processing, edge detection processing, and/or feature extraction processing, so as to detect a subject region D which includes a certain subject (for example, a face region). More specifically, the subject detection section 305 extracts candidate regions which are candidates for a certain subject by performing various kinds of image processing on the image data, such as face detection processing, edge detection processing, and/or feature extraction processing, and detects a region from the extracted candidate regions, the region which meets predetermined identification conditions, as the certain subject (subject region D).

As the predetermined identification conditions, for example, the following conditions are used, the conditions which are associated with: the shape of the subject region D, for example, the shape of the face of a person or the shape of an animal; the size of the subject region D, for example, a percentage of the subject region D in the whole subject existing image P1 (the percentage thereof is 50% or more, for example); and the color tone of the subject region D, for example, the subject region D has high lightness and chroma to be vivid (bright), the subject region D has a skin color, and the like.

The face detection processing, the edge detection processing, and the feature extraction processing are well known, and hence the detailed description thereof is omitted.

The subject cutout section 306 includes an image obtaining section 306a, an image dividing section 306b, an image region specification section 306c, a background color estimation section 306d, a similarity calculation section 306e, a similarity judgment section 306f, a background image generation section 306g, a background region specification section 306h, a subject region specification section 306i, and a subject extraction section 306j.

The image obtaining section 306a obtains the subject existing image P1 in which a subject and a background coexist.

That is, the image obtaining section 306a obtains YUV data of the subject existing image P1 (shown in FIG. 8A) transmitted from the user terminal 2 and received by the communication control section 304 via the predetermined communication network N. The image obtaining section 306a may generate YUV data of a reduced image (for example, a VGA-size image) by reducing the YUV data of the subject existing image P1 to a predetermined percentage thereof in a horizontal (x-axis) direction and in a vertical (y-axis) direction.

The image dividing section 306b divides the subject existing image P1 into a plurality of image regions A.

That is, the image dividing section 306b divides the whole subject existing image P1 into a plurality of image regions A based on the YUV data of the subject existing image P1, the image regions A each of which is composed of a predetermined number of pixels in the horizontal direction and in the vertical direction. More specifically, the image dividing section 306b divides the reduced image of the subject existing image P1 into four image regions A (shown in FIG. 9A) based on the YUV data of the reduced image thereof generated by the image obtaining section 306a, for example.

Although, in the embodiment, dividing low-resolution image data of the subject existing image P1, the image dividing section 306b may divide high-resolution image data thereof. Furthermore, although, in the embodiment, the number of the divided image regions A is four, this is not a limit but an example, and hence the number thereof can be appropriately changed. Furthermore, the image dividing section 306b may divide the subject existing image P1 a predetermined number of times. For example, the image dividing section 306b may divide each of the divided image regions A (four image regions A, for example) into a predetermined number of further divided image regions.

The image region specification section 306c specifies the plurality of image regions A in the subject existing image P1.

That is, the image specification section 306c specifies the image regions A in the subject existing image P1, which is obtained by the image obtaining section 306a, in accordance with predetermined specification conditions. More specifically, the image region specification section 306c specifies the image regions A, into which the subject existing image P1 is divided by the image dividing section 306b, as target regions for each of which the similarity calculation section 306e calculates a similarity between a predetermined one color and a color of the target region.

Although the image region specification section 306c specifies the image regions A, into which the subject existing image P1 is divided by the image dividing section 306, as the target regions, this is not a limit but an example, and hence the image regions A specified as the target regions can be appropriately changed. For example, when a bust shot extraction mode is set, the image region specification section 306c may specify, in a state in which the subject existing image P1 is displayed on a predetermined display region, image regions each of which is located within a predetermined range of distance from the top image boundary of the subject existing image P1 in the downward direction or image regions each of which is located within a predetermined range of distance from the left upper corner and/or the right upper corner of the subject existing image P1, as the target regions. In the bust shot extraction mode, the subject region D is extracted from the subject existing image P1 which is obtained by taking an image of a person from the breasts up, namely a bust shot.

The background color estimation section 306d estimates a color of the background (background color) of the subject existing image P1.

Figure 8B:
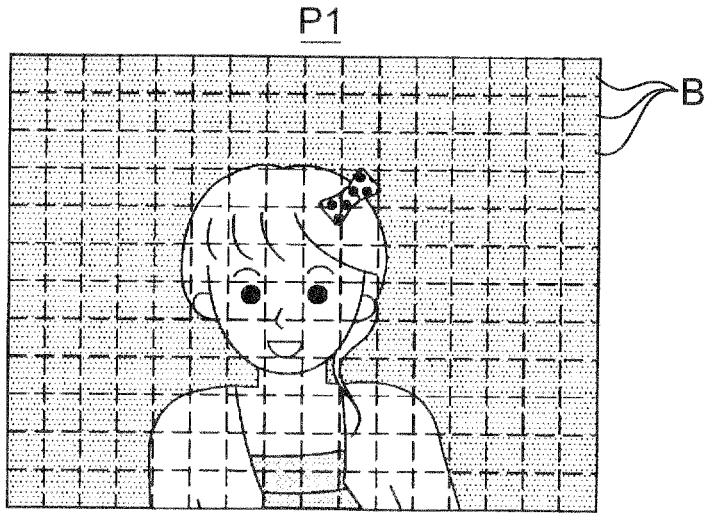

That is, the background color estimation section 306d performs predetermined mathematical operations on the YUV data of the subject existing image P1 obtained by the image obtaining section 306a, so as to estimate the background color thereof with one color. More specifically, the background color estimation section 306d obtains the YUV data of the reduced image of the subject existing image P1, and divides the whole reduced image into a plurality of blocks (regions) B (shown in FIG. 8B) each of which is composed of a predetermined number of pixels in the horizontal direction and in the vertical direction (20 pixels in each direction, for example). The background color estimation section 306d performs a predetermined mathematical operation based on the pixel value of each pixel of each block B, to calculate the representative color (the average color, for example) of each block B. Furthermore, the background color estimation section 306d performs a predetermined mathematical operation based on the pixel value of each pixel of each block B and the representative color of each block B, to calculate the quantity of color unevenness (variance and/or standard deviation, for example) in each block B.

Then, the background color estimation section 306d judges, whether or not the quantity of color unevenness (color unevenness quantity) of each block B is equal to or less than a predetermined value to specify a block/blocks B having the color unevenness quantity being equal to or less than the predetermined value. Thereafter, the background color estimation section 306d judges, for each specified block B, whether or not a specified block B has the similarity (for example, a distance in Euclidean space with respect to each of brightness information and color difference information) in representative color to another specified block (other specified blocks) B, the similarity which is equal to or more than a predetermined value (predetermined judgment value), and votes for a block/blocks B which is judged to have the similarity being equal to or more than the predetermined judgment value. Then, the background color estimation section 306d estimates the representative color of the most-voted block B, namely, the block B which is judged to have the similarity being equal to or more than the predetermined value the most number of times, as the background color (shown in FIG. 8C).

Figure 8C:
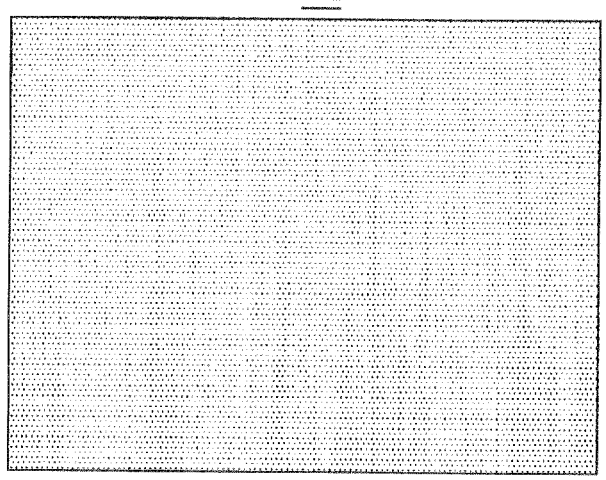

FIG. 8C schematically shows an image P2 in which the estimated background color is evenly disposed over the whole image.

The estimation method of the background color taken by the background color estimation section 306d is not a limit but an example, and hence can be appropriately changed. That is, in the embodiment, the background color estimation section 306d judges whether or not a block B has the similarity in the representative color to another block B being equal to or more than a predetermined judgment value, for each of the blocks B which are judged to have the color unevenness quantity being equal to or less than a predetermined value. However, the background color estimation section 306d may judge whether or not a block B has the similarity in the representative color to another block B being equal to or more than a predetermined judgment value, for each of all the blocks B, regardless of their color unevenness quantity.

Furthermore, the background color estimation section 306d estimates a color of each of the image regions A into which the subject existing image P1 is divided by the image dividing section 306b. That is, the background color estimation section 306d estimates the representative color of each image region A in a similar way as described above.

More specifically, the background color estimation section 306d divides each of the image regions A (shown in FIG. 9A), into which the YUV data of the reduced image of the subject existing image P1 is divided by the image dividing section 306b, into a plurality of blocks (regions) B (shown in FIG. 9B) each of which is composed of a predetermined number of pixels in the horizontal direction and in the vertical direction (20 pixels in each direction, for example). Then, the background color estimation section 306d performs predetermined mathematical operations based on the pixel value of each pixel of each block B of each image region A, to calculate the representative color (the average color, for example) of each block B and the color unevenness quantity (variance and/or standard deviation, for example) in each block B. Then, the background color estimation section 306d specifies, among the blocks B of each image region A, a block/blocks B having the color unevenness quantity being equal to or less than a predetermined value. Thereafter, the background color estimation section 306d votes, among the specified blocks B of each image region A, for a specified block/blocks B having the similarity (for example, a distance in Euclidean space with respect to each of brightness information and color difference information) in the representative color to another specified block (other specified blocks) B being equal to or more than a predetermined judgment value. Then, the background color estimation section 306d estimates, for each image region A, the representative color of the most-voted block B, namely, the representative color of the block B which is judged to have the similarity being equal to or more than the predetermined judgment value the most number of times, as the color of the image region A to which the block B belongs (shown in FIG. 9C).

Figures 9C, 9D:
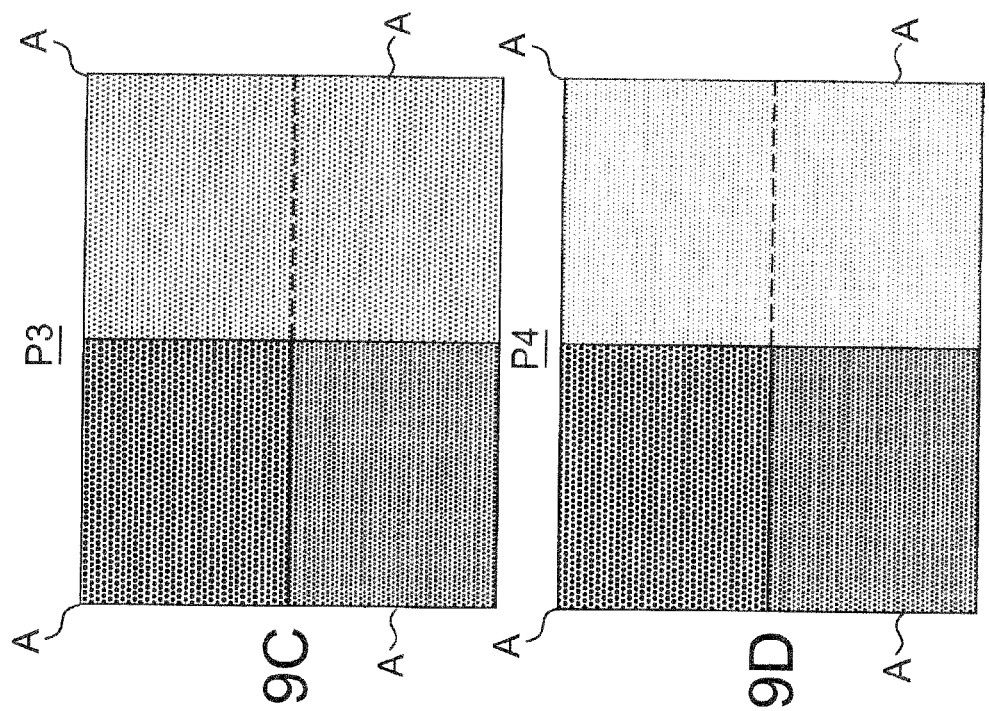
FIGS. 9A to 9D schematically show images in the background generation processing shown in FIG. 7.
Figures 9A, 9B:
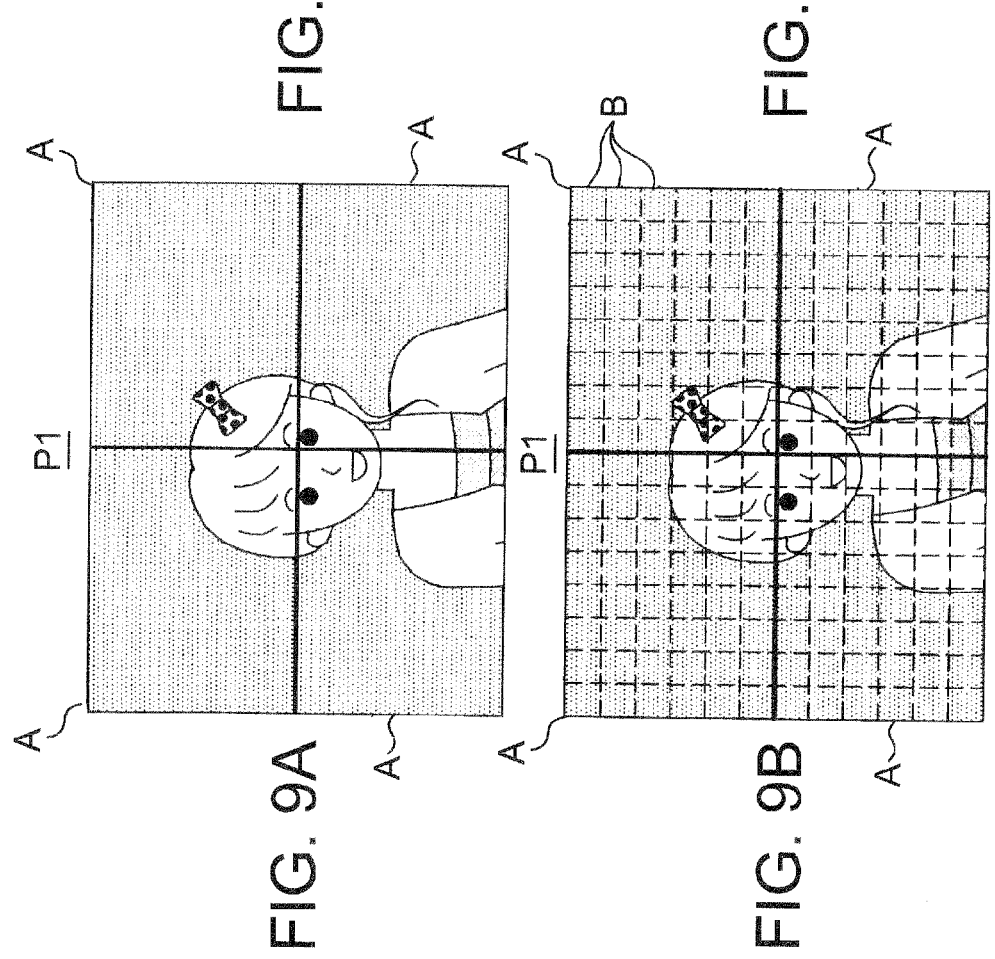

FIG. 9C schematically shows an image P3 in which the estimated colors of the image regions A are evenly disposed on the image regions A, respectively. The image regions A are schematically color-coded by differentiating the number of dots per unit area.

The estimation method of the color of each image region A taken by the background color estimation section 306d is not a limit but an example, and hence can be appropriately changed, like the estimation method of the background color described above.

The similarity calculation section 306e calculates the similarity between the color of each image region A of the subject existing image P1 and a predetermined one color.

That is, the similarity calculation section 306e calculates the similarity between the color of each image region A specified by the image region specification section 306c and a predetermined one color. More specifically, the similarity calculation section 306e calculates the similarity (for example, a distance in Euclidean space with respect to each of brightness information and color difference information) between the background color (shown in FIG. 8C) estimated by the background color estimation section 306d and the color of each image region A (shown in FIG. 9C).

Although, as the predetermined one color, the background color of the subject existing image P1 estimated by the background color estimation section 306d is illustrated, this is not a limit but an example, and hence can be appropriately changed. That is, any color can be used as the predetermined one color as long as the color can be used for the judgment on the similarity to the color of each image region A. For example, the similarity calculation section 306e calculates the average color of colors of each image region A, and uses the average color as the predetermined one color for the judgment on the similarity.

The similarity judgment section 306f judges whether or not the similarity which each image region A has is more than a predetermined judgment value.

That is, the similarity judgment section 306f judges whether or not the similarity between the color of each image region A of the subject existing image P1 and the background color (predetermined one color), the similarity which is calculated by the similarity calculation section 306e, is more than a predetermined judgment value.

The background image generation section 306g generates an extraction-use background image P4 for extracting the subject region D which includes the subject from the subject existing image P1.

That is, the background image generation section 306g generates the extraction-use background image P4 based on the similarity between the color of each image region A of the subject existing image P1 and the background color (predetermined one color), the similarity which is calculated by the similarity calculation section 306e. More specifically, the background image generation section 306g specifies the color of each region of the extraction-use background image P4 corresponding to each image region A of the subject existing image P1 in accordance with the result of comparison between the representative color of each image region A of the subject existing image P1 and the background color, namely, the judgment result made by the similarity judgment section 306f, so as to generate the extraction-use background image P4. For example, the background image generation section 306g adopts the color of the image region A estimated by the background color estimation section 306d as the color of the region of the extraction-use background image P4 corresponding to the image region A of the subject existing image P1 so as to generate the extraction-use background image P4 (shown in FIG. 9D), the image region A which is judged to have the similarity to the background color calculated by the similarity calculation section 306e being more than the predetermined judgment value. On the other hand, the background image generation section 306g adopts the background color as the color of the region of the extraction-use background image P4 corresponding to the image region A of the subject existing image P1 so as to generate the extraction-use background image P4 (shown in FIG. 9D), the image region A which is judged to have the similarity to the background color calculated by the similarity calculation section 306e being equal to or less than the predetermined judgment value. For example, as shown in FIG. 9D, with respect to two image regions A on the left among the four image regions A into which the subject existing image P1 is divided, the background image generation section 306g judges that the similarity between the color of an image region A and the background color is more than the predetermined judgment value, and adopts the color of the image region A as the color of the region of the extraction-use background image P4 corresponding to the image region A of the subject existing image P1. On the other hand, with respect to two image regions A on the right among the four image regions A into which the subject existing image P1 is divided, the background image generation section 306g judges that the similarity between the color of an image region A and the background color is equal to or less than the predetermined judgment value, and adopts the background color as the color of the region of the extraction-use background image P4 corresponding to the image region A of the subject existing image P1.

FIG. 9D schematically shows the extraction-use background image P4 in a state in which the regions corresponding to the image regions A of the subject existing image P1 (image regions A in the extraction-use background image P4) are color-coded by differentiating the number of dots per unit area.

The background region specification section 306h specifies the background constituent region Cb which constitutes the background in the subject existing image P1.

That is, the background region specification section 306h specifies the background constituent region Cb (shown in FIG. 12A) constituting the background in the subject existing image P1 based on the extraction-use background image P4 generated by the background image generation section 306g. More specifically, the background region specification section 306h calculates a difference between the reduced image of the subject existing image P1 and the extraction-use background image P4 on a pixel-to-pixel basis with respect to each of brightness information and color difference information based on the YUV data of the reduced image thereof and the YUV data of the extraction-use background image P4. Then, the background region specification section 306h performs predetermined weighting (for example, Y:U:V≈1:4:4) on the value of the difference calculated on a pixel-to-pixel basis with respect to each of the brightness information and the color difference information, so as to generate one-dimensional difference information.

Thereafter, the background region specification section 306h analyses the generated difference information by using a predetermined analysis method (for example, a discriminant analysis method), and sets a first threshold value for judging the background constituent region Cb constituting a correct region (seed) for the background in the subject existing image P1. For example, the background region specification section 306h calculates, by using the discriminant analysis method, a threshold value by which between-class variance becomes the largest when a plurality of pieces of difference information is divided into two classes, and sets the median of the pieces of difference information being smaller than the threshold value as the first threshold value. The setting method of the first threshold value for judging the background constituent region Cb described above is not a limit but an example, and hence can be appropriately changed. For example, a Gaussian mixture model may be generated based on the result obtained by using the discriminant analysis method, and the first threshold value may be set by taking a valley in the model as a border between the background and the subject.

Then, the background region specification section 306h specifies a block/blocks B as the background constituent region Cb, by regarding the block/blocks B as a support region for the extraction-use background image P4, the block/blocks B, the pixels of which has the difference information being equal to or less than the first threshold value, and which is used by the background image generation section 306g to generate the extraction-use background image P4. More specifically, the background region specification section 306h specifies, as the background constituent region Cb, a block/blocks B which is judged to have the similarity in the representative color to another block (other blocks) B being equal or more than the predetermined judgment value the most number of times when the background color estimation section 306d estimates the background color or the color of each image region A. That is, the background region specification section 306h specifies the most-voted block B as the background constituent region Cb. The estimation method described above is not a limit but an example. Hence, for example, pixels having the difference information being equal to or less than the first threshold value may be specified as the background constituent region Cb.

In a case where, as a result of the face detection processing performed by the subject detection section 305, a face region is detected, or in a case where a bust shot extraction mode is set, the bust short extraction mode in which a subject region D is extracted from the subject existing image P1 obtained by taking an image of a person from the breasts up, namely, a bust shot, the background region specification section 306h may judge whether or not pixels within a predetermined range of distance from the top image boundary or the right and left image boundaries of the subject existing image P1 be specified as the background constituent region Cb (described in detail below).

Figure 12A:
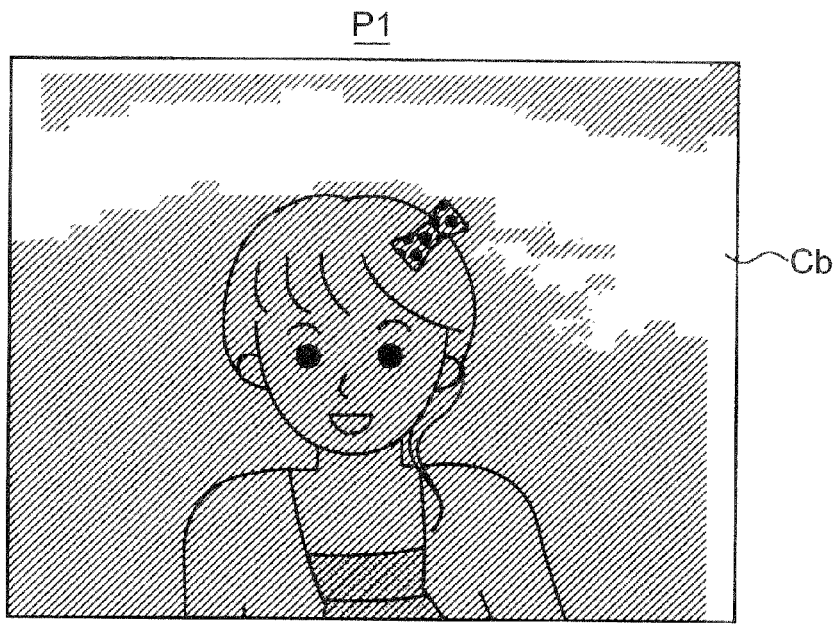
FIGS. 12A and 12B schematically show images in the subject cutout processing shown in FIG. 6.

In FIG. 12A, regions except for the background constituent region Cb of the subject existing image P1 are shown by oblique lines, and the background constituent region Cb is shown in white.

The subject region specification section 306i specifies the subject constituent region Cs constituting the subject in the subject existing image P1.

That is, the subject region specification section 306i specifies the subject constituent region Cs (shown in FIG. 12B) constituting the subject in the subject existing image P1 based on the extraction-use background image P4 generated by the background image generation section 306g. More specifically, the subject region specification section 306i calculates a difference between the reduced image of the subject existing image P1 and the extraction-use background image P4 on a pixel-to-pixel basis with respect to each of brightness information and color difference information. Then, the subject region specification section 306*i* performs predetermined weighting (for example, Y:U:V≈1:4.5:4.5) on the value of the difference calculated on a pixel-to-pixel basis with respect to each of the brightness information and the color difference information, so as to generate one-dimensional difference information.

Thereafter, the subject region specification section 306*i* analyses the generated difference information by using a predetermined analysis method (for example, a discriminant analysis method), and sets a threshold value for judging the subject constituent region Cs constituting a correct region (seed) for the subject in the subject existing image P1. For example, the subject region specification section 306*i* calculates, by using the discriminant analysis method, a threshold value by which between-class variance becomes the largest when a plurality of pieces of difference information is divided into two classes, and sets the median of the pieces of difference information being larger than the threshold value as the threshold value for the judgment. The setting method of the threshold value for judging the subject constituent region Cs described above is not a limit but an example, and hence can be appropriately changed. For example, a Gaussian mixture model may be generated based on the result obtained by using the discriminant analysis method, and the threshold value for the judgment may be set by utilizing the region having the difference information larger than a valley in the model.

Then, the subject region specification section 306*i* specifies pixels having the difference information being more than the threshold value for the judgment as the subject constituent region Cs.

The subject region specification section 306*i* may specify a certain block B among the blocks B, into which the reduced image of the subject existing image P1 is divided, as the subject constituent region Cs by regarding the block B as a region in which the image greatly varies. The block B is the one, the color unevenness quantity (variance and/or standard deviation, for example) of which is different from the color unevenness quantities of blocks B surrounding the block B by a predetermined value or more. Furthermore, when a face region is detected by the face detection processing performed by the subject detection section 305, the subject region specification section 306*i* may specify the detected face region as the subject constituent region Cs (described in detail below).

Figure 12B:
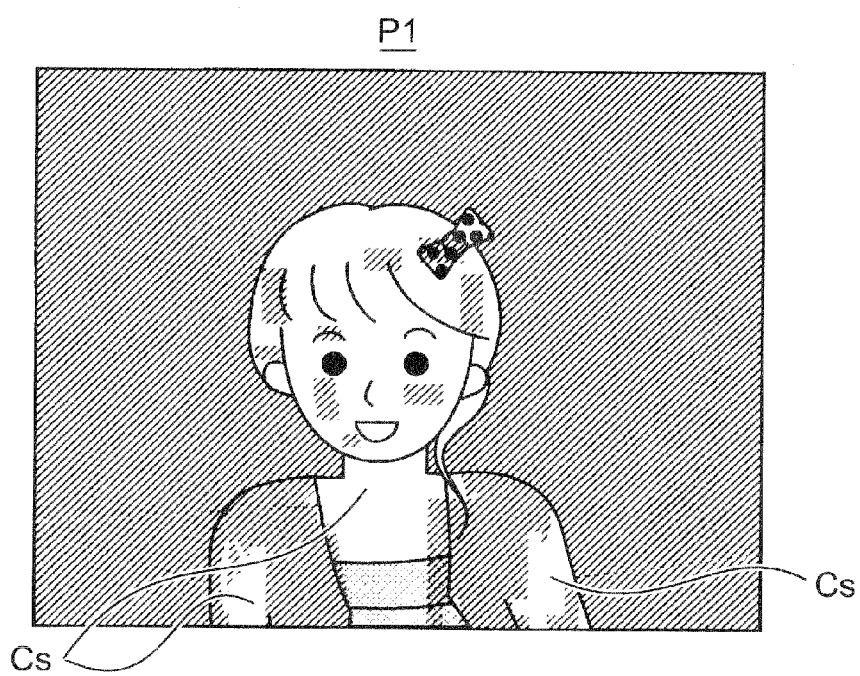

In FIG. 12B, regions except for the subject constituent region Cs of the subject existing image P1 are shown by oblique lines, and the subject constituent region Cs is shown in white.

As described above, the subject region specification section 306*i* and the background region specification section 306*h* respectively specify the subject constituent region Cs constituting the subject in the subject existing image P1 and the background constituent region Cb constituting the background therein based on the extraction-use background image P4 generated by the background image generation section 306*g*.

The subject extraction section 306*j* extracts the subject region D which includes the subject from the subject existing image P1.

That is, the subject extraction section 306*j* includes a binary image generation section 306*k* which generates a binary image based on the subject constituent region Cs and the background constituent region Cb respectively specified by the subject region specification section 306*i* and the background region specification section 306*h*. The subject extraction section 306*j* extracts the subject region D which includes the subject from the subject existing image P1 based on the binary image generated by the binary image generation section 306*k*.

Figure 15A:
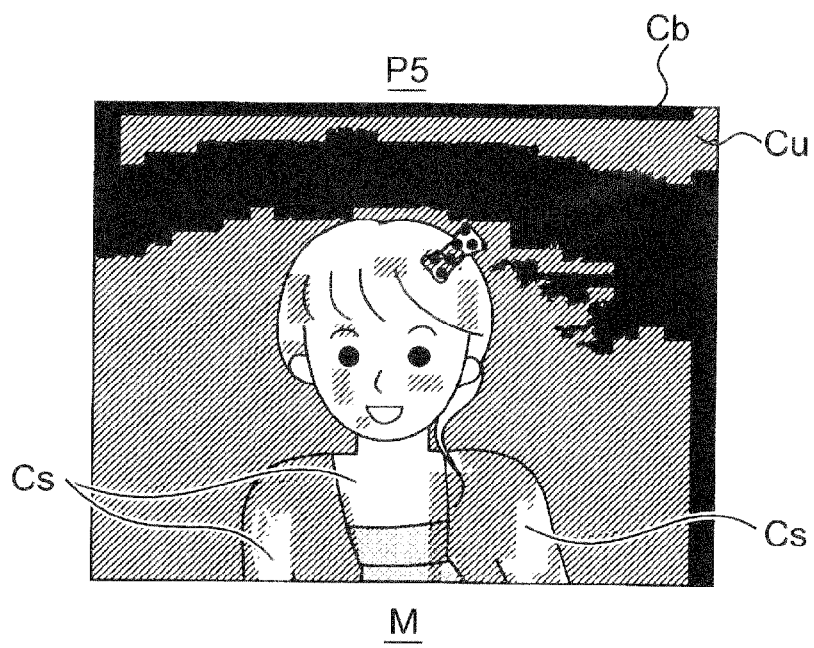
FIGS. 15A to 15C schematically show images in the subject cutout processing shown in FIG. 6.

More specifically, the binary image generation section 306*k* generates a ternary image P5 (shown in FIG. 15A) by regarding a region other than the subject constituent region Cs and the background constituent region Cb in the subject existing image P1 as an unsettled region Cu which is undecided to be the subject or the background, and then setting the pixel value of the subject constituent region Cs to "1", the pixel value of the background constituent region Cb to "0", and the pixel value of the unsettled region Cu to "0.5". In FIG. 15A, the background constituent region Cb in the ternary image P5 is shown in black, the subject constituent region Cs therein is shown in white, and the unsettled region Cu therein is shown by oblique lines.

Then, the binary image generation section 306*k* sets a predetermined energy function for the ternary image P5, and determines the pixel value of each pixel constituting the unsettled region Cu by calculating a parameter which minimizes the set energy function.

For example, in a case where a graph cut algorithm is used as a method of energy minimization, the binary image generation section 306*k* generates a Gaussian mixture model in accordance with color information (brightness information and color difference information) on regions respectively corresponding to the subject constituent region Cs and the background constituent region Cb of the subject existing image P1, and calculates the likelihood of the subject (subject likelihood) and the likelihood of the background (background likelihood) for each pixel of the unsettled region Cu based on the Gaussian mixture model. The subject likelihood represents how close a target pixel is to a subject. That is, the subject likelihood expresses the likelihood (possibility) that the target pixel is a pixel constituting a subject, by a numeral value. Similarly, the background likelihood represents how close a target pixel is to a background. That is, the background likelihood expresses the likelihood (possibility) that the target pixel is a pixel constituting a background, by a numeral value.

Then, the binary image generation section 306*k* sets the subject constituent region Cs, the background constituent region Cb, and the subject likelihood and the background likelihood of each pixel of the unsettled region Cu to the data term of the energy function. In addition, the binary image generation section 306*k* sets a difference in color difference information between a pixel to its surrounding pixels (adjacent pixels, for example) of the unsettled region Cu to the smoothing term, with respect to each pixel of the unsettled region Cu. Then, the binary image generation section 306*k* calculates the parameter which minimizes the set energy function, and determines the pixel value of each pixel of the unsettled region Cu as the pixel value for the subject region D or the pixel value for the background region. At the time, a noise removal characteristic may be set in the smoothing term by taking the detection result of a certain subject detected by the subject detection section 305, such as the detection result of the face detection processing, into consideration, so as to handle the hair around the face region.

Thus, the binary image generation section 306*k* generates the binary image in which the pixel value of the subject region D is "1", and the pixel value of the background region is "0".

Then, the subject extraction section 306*j* generates an extraction-use image for extracting the subject region D, based on the binary image generated by the binary image generation section 306*k*. The extraction-use image indicates the position of the subject region D in the subject existing image P1.

As the extraction-use image, for example, an alpha map M is used. The alpha map M shows the weight by an α value ($0 \leq \alpha \leq 1$) for each pixel of the subject existing image P1 used when alpha blending is performed on a subject image and a predetermined background.

More specifically, the subject extraction section 306j performs, for example, reduction processing on the binary image to eliminate regions in which differences caused by small noise or camera shake exist, thereby excluding pixel groups, the values of which are smaller than a predetermined value, and/or thin-line pixel groups produced by the camera shake. Then, the subject extraction section 306j performs labeling processing by which a same number is attached to pixels of a same connected component so as to produce a plurality of pixel groups, and performs enlargement processing by which the reduction by the reduction processing is corrected thereafter. Furthermore, the subject extraction section 306j performs the labeling processing inside the pixel group having the largest area (largest pixel group) specified as a subject part, and changes the pixel value of each pixel of an inside pixel group having a label percentage equal to or less than a predetermined percentage, the pixel value which is for a background region, to the pixel value for the subject part so as to replace the pixel group by the subject part, thereby performing filling-up processing. The label percentage expresses the number of background labels in the number of subject-part labels as percentage.

Thereafter, the subject extraction section 306j performs low-pass filtering on the binary image in which the pixel value of the largest pixel group corresponding to the subject part is "1", and the pixel value of the other part corresponding to the background region is "0", so as to produce an intermediate value at a border part therebetween, thereby creating a predetermined α value for each region. As a result, the subject region D has an α value of 1 and a transparency of 0% to a predetermined background of the subject existing image P1. On the other hand, the background part of the subject has an α value of 0 and a transparency of 100% to the predetermined background of the subject existing image P1.

Figure 15B:
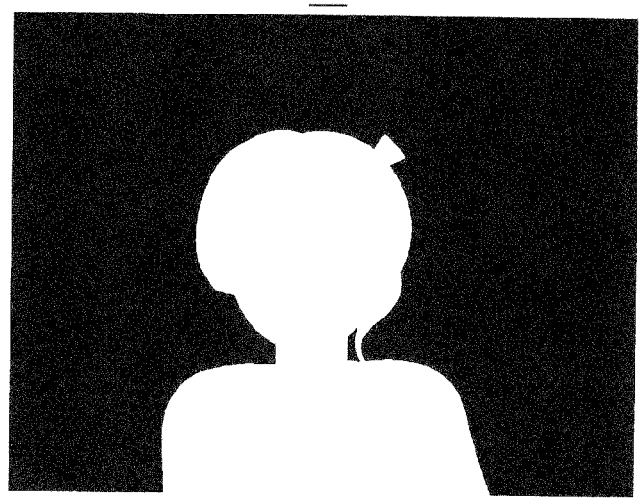

In FIG. 15B, the subject region D in the alpha map M is shown in white, and the background region therein is shown in black.

Figure 15C:
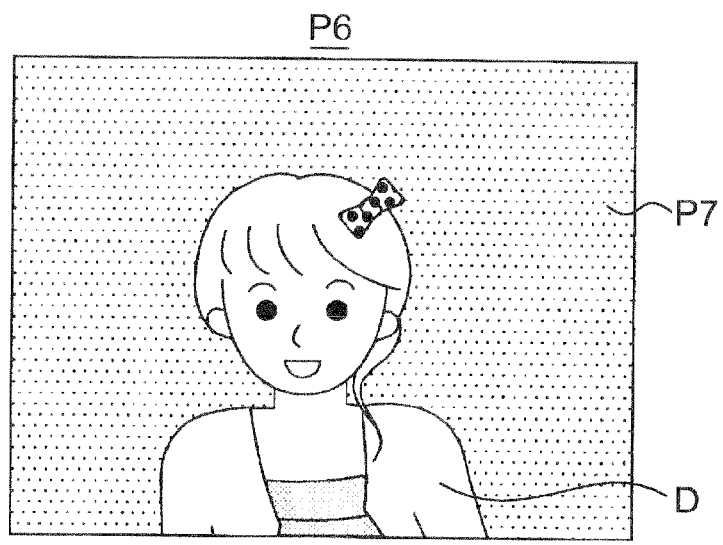

Then, the subject extraction section 306j combines the subject image with a predetermined one-color image P7 based on the generated extraction-use image (alpha map M), in such a way as, of the pixels of the subject existing image P1, not to allow the pixels having an α value of 1 to pass through the predetermined one-color image P7, and to allow the pixels having an α value of 0 to pass through the predetermined one-color image P7, thereby generating the image data of a subject cutout image P6 (shown in FIG. 15C).

Next, the subject image generation processing performed by using the user terminal 2 and the server 3 is described with reference to FIGS. 5 to 15C.

Figure 5:
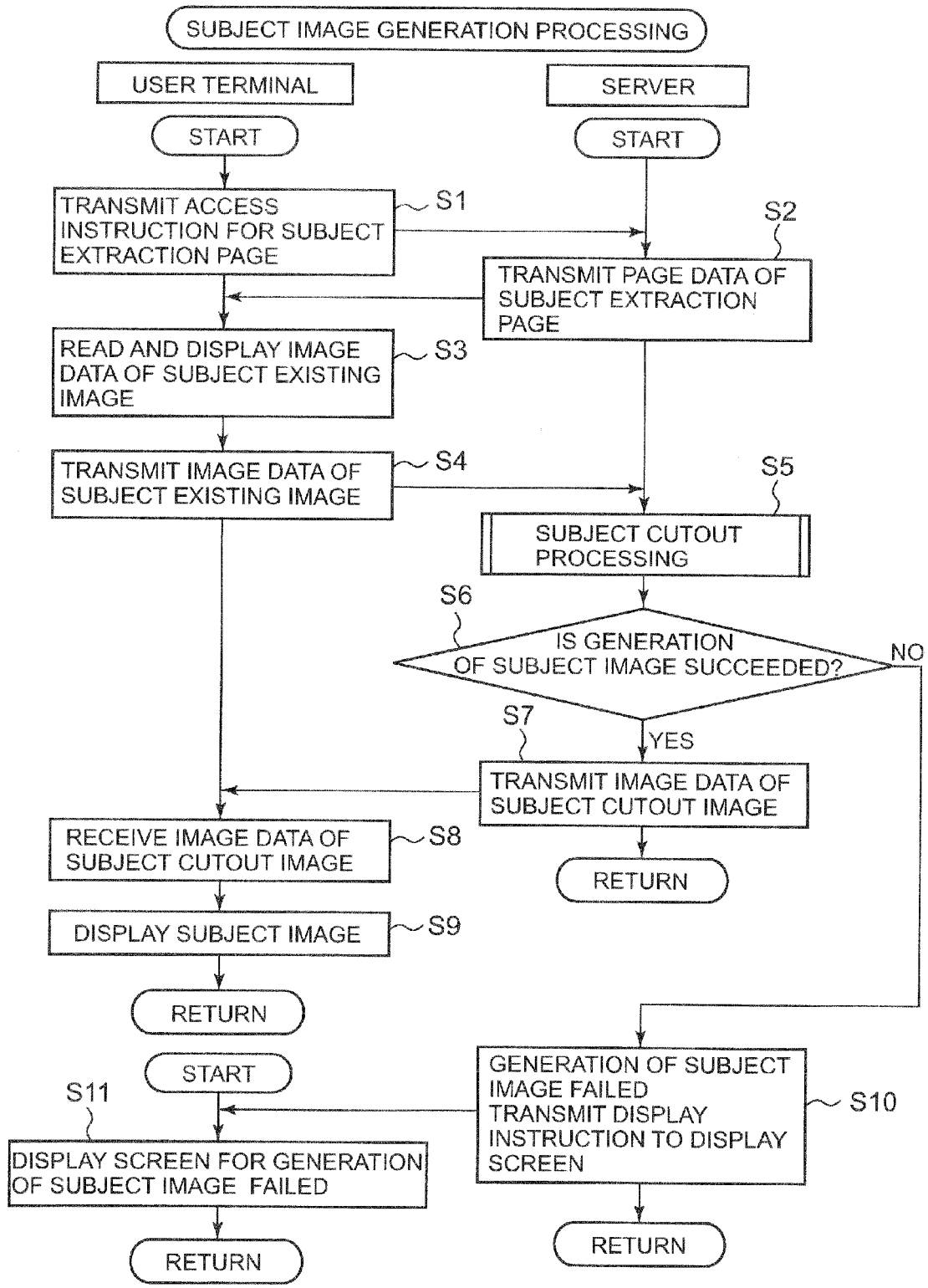
FIG. 5 is a flowchart showing subject image generation processing performed by the subject cutout system.
Figure 6:
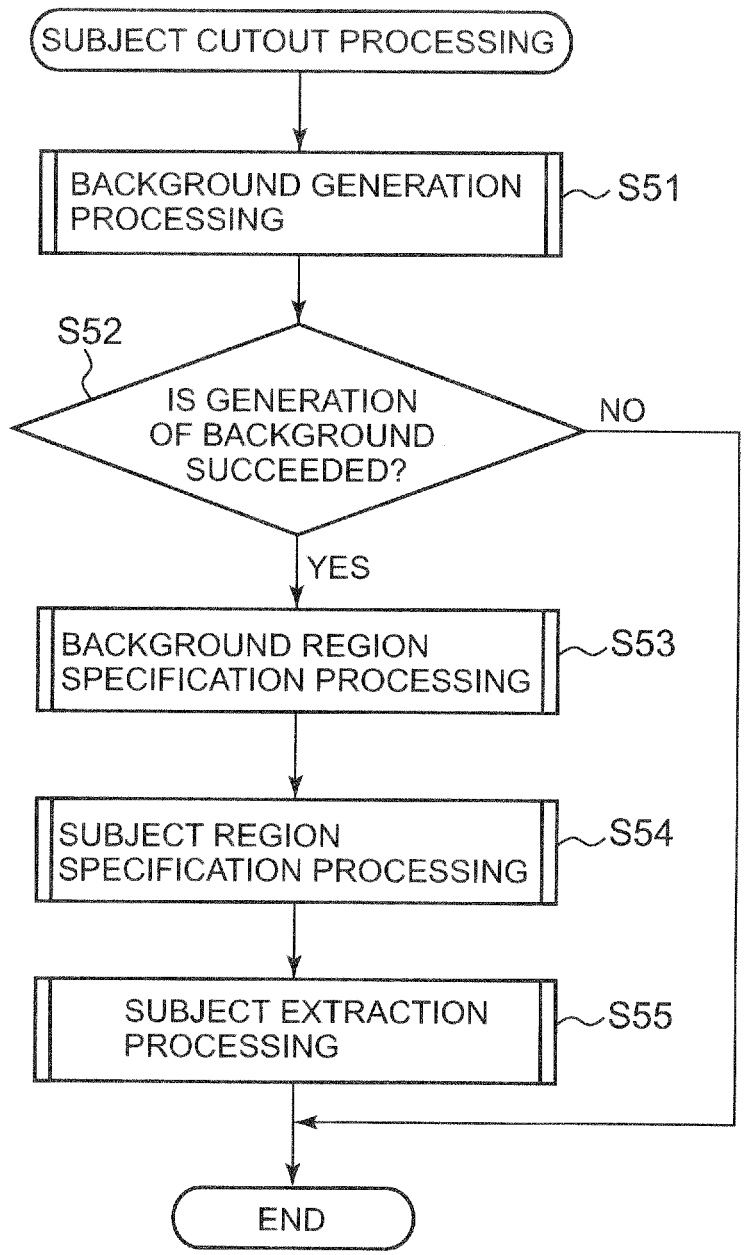
FIG. 6 is a flowchart showing subject cutout processing in the subject image generation processing shown in FIG. 5.

FIG. 5 is a flowchart showing the subject image generation processing according to the first embodiment of the present invention. FIG. 6 is a flowchart showing subject cutout processing in the subject image generation processing.

In the following, the recording medium M on which the image data of the subject existing image P1 generated by the imaging apparatus 1 is recorded is attached to the recording medium control section 204 of the user terminal 2.

As shown in FIG. 5, when an access instruction to access the subject extraction page opened by the server 3 is inputted into the central control section 201 of the user terminal 2 based on a predetermined operation of the operation input section 205 by a user, the CPU of the central control section 201 transmits the access instruction with the communication control section 202 to the server 3 via the predetermined communication network N (Step S1).

When the communication control section 304 of the server 3 receives the access instruction transmitted from the user terminal 2, the CPU of the central control section 301 transmits page data of the subject extraction page with the communication control section 304 to the user terminal 2 via the predetermined communication network N (Step S2).

When the communication control section 202 of the user terminal 2 receives the page data of the subject extraction page, the display section 203 displays a predetermined subject extraction page on the display screen thereof based on the page data of the subject extraction page.

After the recording medium control section 204 of the user terminal 2 reads the image data of the subject existing image P1 for the subject image generation processing from the recording medium M, the display section 203 displays the image data of the subject existing image P1 on the display screen thereof (Step S3). Next, the communication control section 202 transmits the read image data (YUV data) of the subject existing image P1 to the server 3 via the predetermined communication network N (Step S4).

When the communication control section 304 of the server 3 receives the image data of the subject existing image P1 transmitted from the user terminal 2, the server 3 performs the subject cutout processing (shown in FIG. 6) by which the subject region D which includes the subject is cut out from the subject existing image P1 (Step S5).

As shown in FIG. 6, in the subject cutout processing, the subject cutout section 306 first performs background generation processing (shown in FIG. 7, described in detail below) by which the extraction-use background image P4 for extracting the subject region D which includes the subject from the subject existing image P1 is generated (Step S51). Then, the subject cutout section 306 judges whether or not the generation of the extraction-use background image P4 is succeeded (Step S52).

When it is judged that the generation of the extraction-use background image P4 is succeeded (Step S52; YES), the background region specification section 306h of the subject cutout section 306 performs background region specification processing (shown in FIG. 10, described in detail below) by which the background constituent region Cb constituting the background in the subject existing image P1 is specified (Step S53). Next, the subject region specification section 306i of the subject cutout section 306 performs subject region specification processing (shown in FIG. 11, described in detail below) by which the subject constituent region Cs constituting the subject in the subject existing image P1 is specified (Step S54).

Thereafter, the subject extraction section 306j of the subject cutout section 306 performs subject extraction processing (shown in FIG. 13, described in detail below) by which the subject region D which includes the subject is extracted from the subject existing image P1 (Step S55). Then, the subject cutout section 306 ends the subject cutout processing.

On the other hand, when it is judged that the generation of the extraction-use background image P4 is not succeeded (Step S52; NO), the subject cutout section 306 ends the subject cutout processing.

With reference to FIG. 5 again, the subject cutout section 306 judges whether or not the subject cutout processing is succeeded, namely, whether or not the generation of a subject image is succeeded, based on the result of extraction result judgment processing (Step S6).

When it is judged that the generation of the subject image is succeeded (Step S6; YES), the CPU of the central control section 301 transmits the image data of the generated subject cutout image P6 with the communication control section 304 to the user terminal 2 via the predetermined communication network N (Step S7).

When the communication control section 202 of the user terminal 2 receives the image data of the subject cutout image P6 (Step S8), the display section 203 displays the subject image on the display screen thereof based on the image data of the subject cutout image P6 (Step S9).

On the other hand, when it is judged that the generation of the subject image is not succeeded (Step S6; NO), the CPU of the central control section 301 transmits a display instruction to display a screen associated with the failure of the generation of the subject image with the communication control section 304 to the user terminal 2 via the predetermined communication network N (Step S10).

When the communication control section 202 of the user terminal 2 receives the display instruction to display the screen associated with the failure of the generation of the subject image, the display section 203 displays a predetermined screen associated with the failure of the generation of the subject image on the display screen thereof (Step S11).

Next, the background generation processing in the subject cutout processing is described with reference to FIGS. 7 to 9D.

Figure 7:
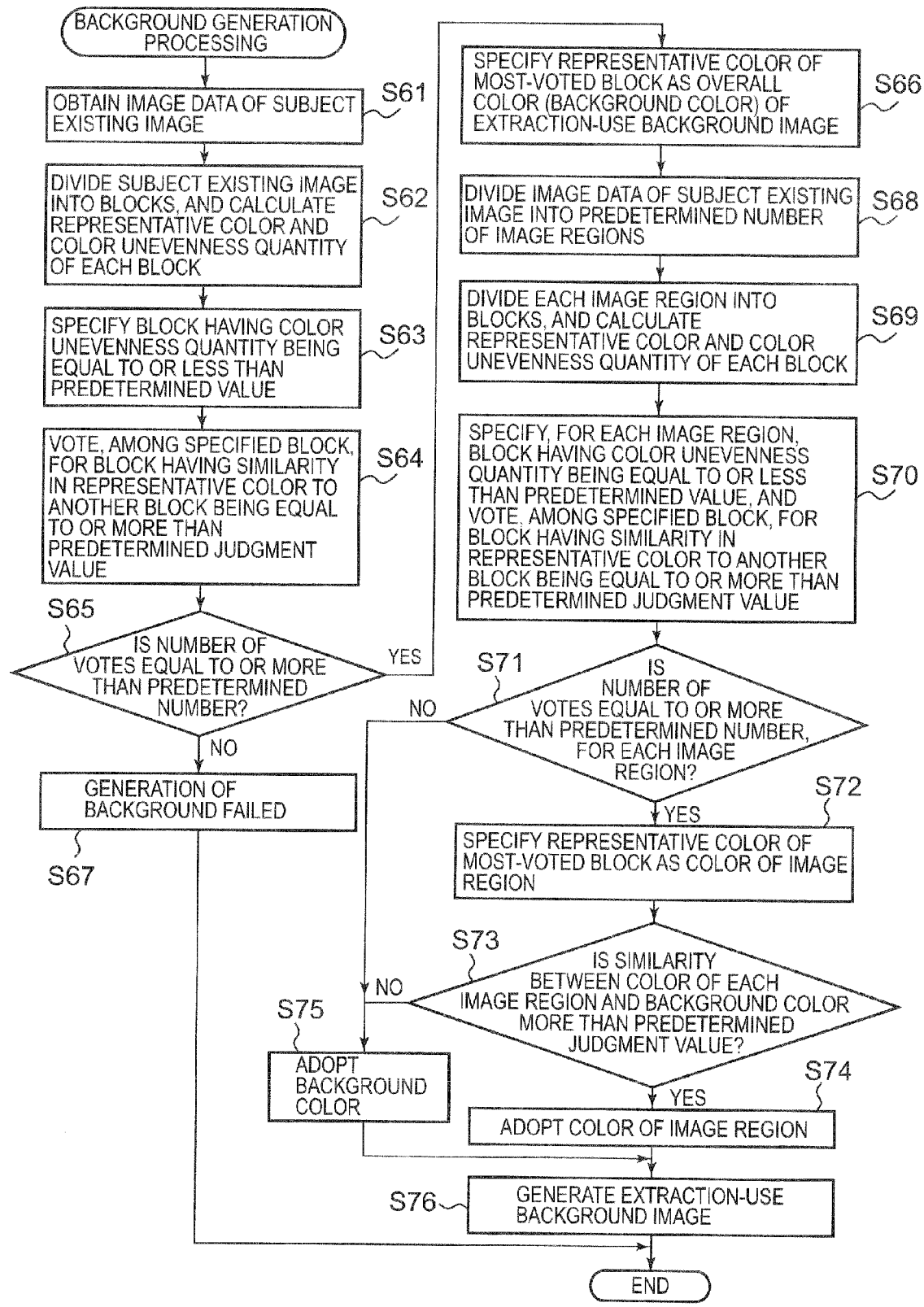
FIG. 7 is a flowchart showing background generation processing in the subject cutout processing shown in FIG. 6.

FIG. 7 is a flowchart showing the background generation processing.

As shown in FIG. 7, the image obtaining section 306a of the subject cutout section 306 obtains the YUV data of the subject existing image P1 (shown in FIG. 8A) transmitted from the user terminal 2 and received by the communication control section 304 via the predetermined communication network N (Step S61). In addition, the image obtaining section 306a generates the reduced image (VGA size image, for example) of the subject existing image P1 by reducing the YUV data of the subject existing image P1 to a predetermined percentage thereof in the horizontal (x-axis) direction and in the vertical (y-axis) direction.

Next, the background color estimation section 306d of the subject cutout section 306 divides the subject existing image P1 into a plurality of blocks B, and then calculates the representative color of each block B and the color unevenness quantity thereof (Step S62).

More specifically, the background color estimation section 306d divides the whole reduced image of the subject existing image P1 into a plurality of blocks B (shown in FIG. 8B) each of which is composed of a predetermined number of pixels in the horizontal direction and in the vertical direction (20 pixels in each direction, for example) based on the YUV data of the reduced image thereof. Then, the background color estimation section 306d performs predetermined mathematical operations based on the pixel value of each pixel of each block B, thereby calculating the representative color of each block B and the color unevenness quantity in each block B.

Next, the background color estimation section 306d judges, for each block B, whether or not the color unevenness quantity is equal to or less than a predetermined value, and specifies a block/blocks B having the color unevenness quantity being equal to or less than the predetermined value (Step S63). Then, the background color estimation section 306d judges, for each specified block B, whether or not the similarity between the representative color of its own and the representative color of each of other specified blocks B is equal to or more than a predetermined judgment value, and votes for a block/blocks B having the similarity being equal to or more than the predetermined judgment value (Step S64).

Next, the background color estimation section 306d judges whether or not the number of votes casted at Step S64 is equal to or more than a predetermined number (Step S65).

When it is judged that the number of votes casted at Step S64 is equal to or more than the predetermined number (Step S65; YES), the background color estimation section 306d specifies the representative color of the block B (most-voted block B) as the overall color (background color) (shown in FIG. 8C) of the extraction-use background image P4, the block B which is judged to have the similarity being equal to or more than the predetermined judgment value the most number of times (Step S66).

On the other hand, when it is judged that the number of votes casted at Step S64 is not equal to or more than the predetermined number (Step S65; NO), the subject cutout section 306 judges that the generation of the extraction-use background image P4 is failed (Step S67), and ends the background generation processing.

After specifying the overall color (background color) of the extraction-use background image P4, the image dividing section 306b of the subject cutout section 306 divides the whole reduced image of the subject existing image P1 into a plurality (four, for example) of image regions A (shown in FIG. 9A) each of which is composed of a predetermined number of pixels in the horizontal direction and in the vertical direction, based on the YUV data of the reduced image thereof (Step S68). Then, the image region specification section 306c specifies the image regions A, into which the reduced image of the subject existing image P1 is divided by the image dividing section 306b, as target regions for each of which the similarity calculation section 306e calculates the similarity between the color (representative color) of its own and the background color (predetermined one color) of the extraction-use background image P4.

Next, the background color estimation section 306d divides each image region A into a plurality of blocks B (shown in FIG. 9B) each of which is composed of a predetermined number of pixels in the horizontal direction and in the vertical direction (20 pixels in each direction, for example), and then performs predetermined mathematical operations based on the pixel value of each pixel of each block B, thereby calculating the representative color of each block B and the color unevenness quantity in each block B (Step S69).

Next, for each block B of each image region A, the background color estimation section 306d judges whether or not the color unevenness quantity is equal to or less than a predetermined value, and specifies a block/blocks B having the color unevenness quantity being equal to or less than the predetermined value. Thereafter, for each specified block B of each image region A, the background color estimation section 306d judges whether or not the similarity between the representative color of its own and the representative color of each of other specified blocks B is equal to or more than a predetermined judgment value, and votes for a block/blocks B having the similarity being equal to or more than the predetermined judgment value (Step S70).

Next, for each image region A, the background color estimation section 306d judges whether or not the number of votes casted at Step S70 is equal to or more than a predetermined number (Step S71).

When it is judged that the number of votes casted at Step S70 is equal to or more than the predetermined number (Step S71; YES), the background color estimation section 306d specifies, for each image region A, the representative color of a block B (most-voted block B) as the color (representative color) of an image region A (shown in FIG. 9C) to which the block B belongs, the block B which is judged to have the similarity being equal to or more than the predetermined judgment value the most number of times (Step S72).

Next, the similarity calculation section 306e of the subject cutout section 306 calculates the similarity (for example, a distance in Euclidean space with respect to each of brightness information and color difference information) between the color of each image region A and the background color. Then, the similarity judgment section 306f judges whether or not the calculated similarity between the color of each image region A and the background color is more than a predetermined judgment value (Step S73).

For the image region A which is judged to have the similarity to the background color being more than the predetermined judgment value at Step S73 (Step S73; YES), the background image generation section 306g of the subject cutout section 306 adopts the color of the image region A specified by the background color estimation section 306d as the color of a region of the extraction-use background image P4, the region which corresponds to the image region A (Step S74). On the other hand, for the image region A which is judged to have the similarity to the background color being equal to or less than the predetermined judgment value at Step S73 (Step S73; NO), the background image generation section 306g adopts the background color as the color of a region of the extraction-use background image P4, the region which corresponds to the image region A (Step S75).

In addition, for the image region A which is judged that the votes casted at Step S70 is not equal to or more than the predetermined number at Step S71 (Step S71; NO), the background image generation section 306g adopts the background color as the color of a region of the extraction-use background image P4, the region which corresponds to the image region A (Step S75).

Thereafter, the background image generation section 306g generates the YUV data of the extraction-use background image P4 (shown in FIG. 9D) in accordance with the color adopted for each region of the extraction-use background image P4, each region which corresponds to each image region A of the subject existing image P1 (Step S76).

This ends the background generation processing.

Next, the background region specification processing in the subject cutout processing is described with reference to FIGS. 10 and 12A.

Figure 10:
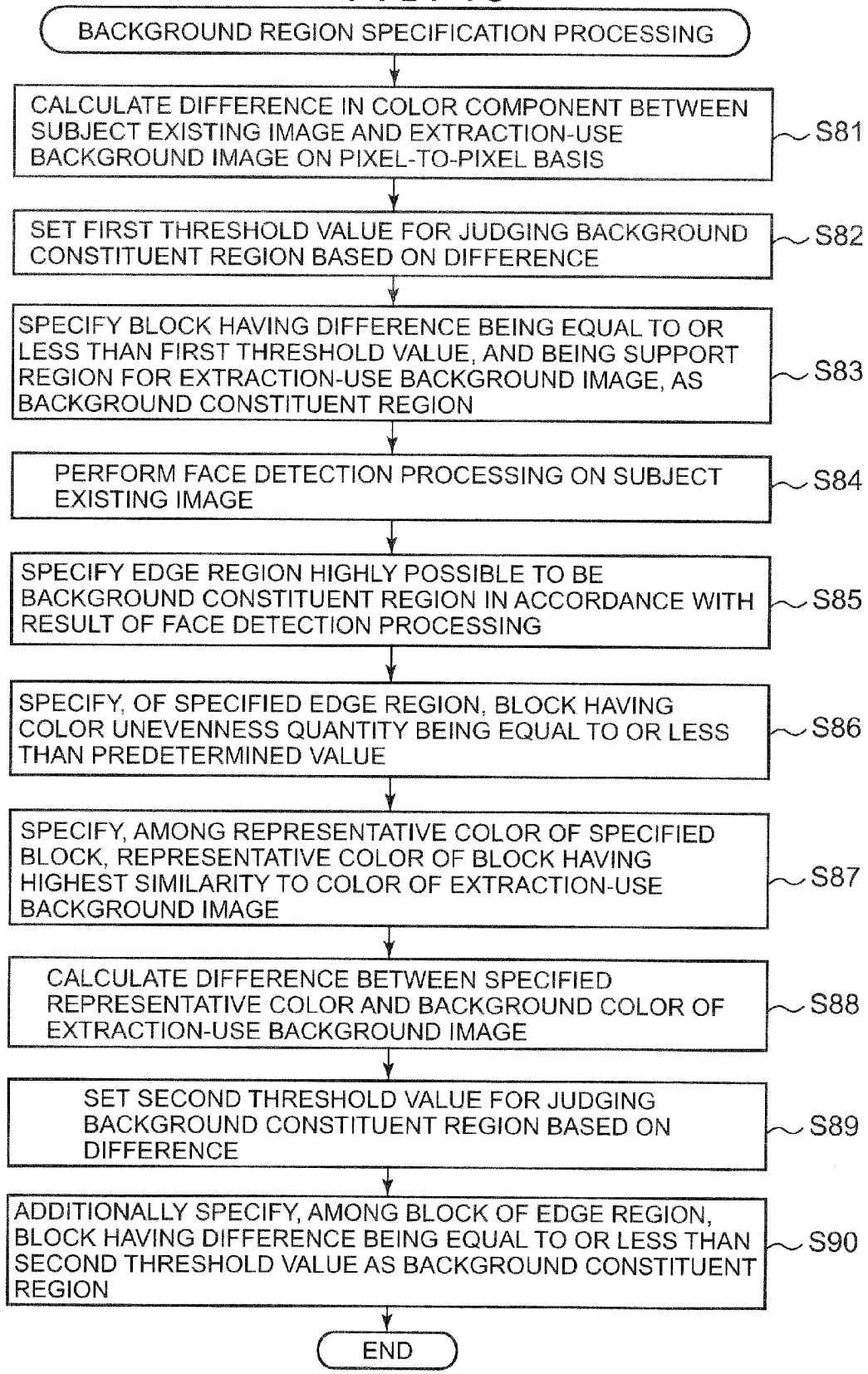
FIG. 10 is a flowchart showing background region specification processing in the subject cutout processing shown in FIG. 6.

FIG. 10 is a flowchart showing the background region specification processing.

As shown in FIG. 10, the background region specification section 306h of the subject cutout section 306 calculates a difference between the reduced image of the subject existing image P1 and the extraction-use background image P4 on a pixel-to-pixel basis with respect to each of brightness information and color difference information based on the YUV data of the reduced image thereof and the YUV data of the extraction-use background image P4 (Step S81). Then, the background region specification section 306h performs predetermined weighting on the value of the difference calculated on a pixel-to-pixel basis with respect to each of the brightness information and the color difference information, so as to generate one-dimensional difference information.

Next, the background region specification section 306h sets a first threshold value for judging the background constituent region Cb constituting a correct region for the background in the subject existing image P1, based on the generated difference information (Step S82). More specifically, the background region specification section 306h calculates, by using the discriminant analysis method, a threshold value by which between-class variance becomes the largest when a plurality of pieces of difference information is divided into two classes, and sets the median of the pieces of difference information being smaller than the threshold value as the first threshold value.

Then, the background region specification section 306h specifies a block/blocks B as the background constituent region Cb (shown in FIG. 12A), by regarding the block/blocks B as a support region for the extraction-use background image P4, the block/blocks B, the pixels of which have the difference information being equal to or less than the first threshold value, and which is used by the background image generation section 306g to generate the extraction-use background image P4 (Step S83). More specifically, the background region specification section 306h specifies, as the background constituent region Cb, a block/blocks B which is judged to have the similarity between the representative color of its own and the representative color of each of other blocks B being equal or more than the predetermined judgment value the most number of times when the background color estimation section 306d estimates the background color or the color of each image region A. That is, the background region specification section 306h specifies the most-voted block B as the background constituent region Cb.

Next, the subject detection section 305 performs predetermined face detection processing on the YUV data of the subject existing image P1, thereby detecting a face region (Step S84).

Next, the background region specification section 306h specifies an edge region in accordance with the result of the face detection processing performed by the subject detection section 305, the edge region which is a region having a high possibility to be the background constituent region Cb in the subject existing image P1 (Step S85). More specifically, a region within a predetermined range of distance (20 pixels, for example) from the top image boundary or the right and left image boundaries of the subject existing image P1 is specified as the edge region which has a high possibility to be the background constituent region Cb.

Although the result of the face detection processing is taken into consideration to specify the edge region which has a high possibility to be the background constituent region Cb, this is not a limit but an example. Hence, for example, in a case where the bust shot extraction mode is set, pixels within a predetermined range of distance from the top image boundary or the right and left image boundaries of the subject existing image P1 may be specified as the background constituent region Cb. In the bust shot extraction mode, the subject region D is extracted from the subject existing image P1 which is obtained by taking an image of a person from the breasts up, namely, a bust shot.

Next, for each block B which constitutes the edge region, and which is composed of a predetermined number of pixels in the horizontal direction and in the vertical direction (20 pixels in each direction, for example), the background region specification section 306h judges whether or not the color unevenness quantity (variance and/or standard deviation, for example) is equal to or less than a predetermined value, and specifies a block/blocks B having the color unevenness quantity being equal to or less than the predetermined value (Step S86).

Next, for each specified block B, the background region specification section 306h calculates the similarity between the representative color of its own and the color of the extraction-use background image P4 (the background color or the color of its image region A), and specifies the representative color of a block B having the highest similarity to the color of the extraction-use background image P4 (Step S87). Next, the background region specification section 306h calculates a difference between the specified representative color and the background color of the extraction-use background image P4 (Step S88), and sets a second threshold value for judging the background constituent region Cb constituting a correct section for the background in the subject existing image P1, based on the calculated difference (Step S89).

The second threshold value is loose compared with the first threshold value in the judgment. For example, the second threshold value is set in such a way that, of the blocks B constituting the edge region which has a high possibility to be the background constituent region Cb, a block/blocks B is specified as the background constituent region Cb, the block/blocks B which has a difference between the representative color of its own and the color of the extraction-use background image P4 being equal to or less than a difference between the representative color specified at Step S87 and the background color of the extraction-use background image P4. Alternatively, the threshold value which is calculated to set the first threshold value at Step S82, namely, the threshold value by which between-class variance becomes the largest when a plurality of pieces of difference information is divided into two classes, may be set as the second threshold value.

Then, the background region specification section 306h additionally specifies, among the blocks B constituting the edge region, a block/blocks B having the difference information between the representative color of its own and the color of the extraction-use background image P4 (the background color or the color of its image region A) being equal to or less than the second threshold value, as the background constituent region Cb (Step S90).

Alternatively, of the edge region, a region having a difference between the color of its own and the representative color specified at Step S87 being equal to or less than a predetermined value may be additionally specified as the background constituent region Cb.

This ends the background region specification processing.

Next, the subject region specification processing in the subject cutout processing is described with reference to FIGS. 11 and 12B.

Figure 11:
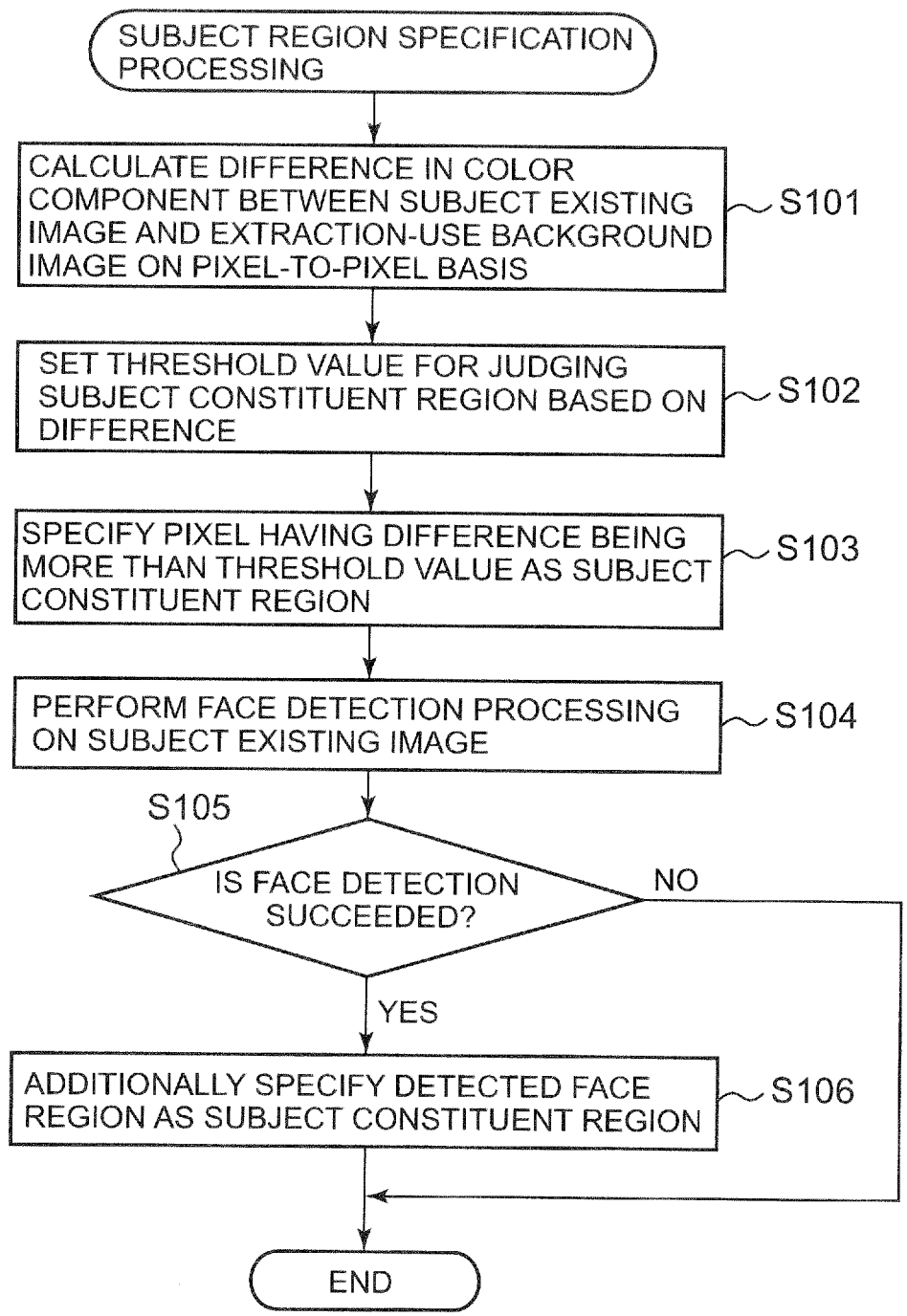
FIG. 11 is a flowchart showing subject region specification processing in the subject cutout processing shown in FIG. 6.

FIG. 11 is a flowchart showing the subject region specification processing. The subject region specification section 306i of the subject cutout section 306 calculates a difference between the reduced image of the subject existing image P1 and the extraction-use background image P4 on a pixel-to-pixel basis with respect to each of brightness information and color difference information based on the YUV data of the reduced image thereof and the YUV data of the extraction-use background image P4 (Step S101). Then, the subject region specification section 306i performs predetermined weighting on the value of the difference calculated on a pixel-to-pixel basis with respect to each of the brightness information and the color difference information, so as to generate one-dimensional difference information.

Next, the subject region specification section 306i sets a threshold value for judging the subject constituent region Cs constituting a correct region for the subject in the subject existing image P1, based on the generated difference information (Step S102). More specifically, the subject region specification section 306i calculates, by the discriminant analysis method, a threshold value by which between-class variance becomes the largest when a plurality of pieces of difference information is divided into two classes, and sets the median of the pieces of difference information being larger than the threshold value as the threshold value for the judgment.

Then, the subject region specification section 306i specifies pixels having the difference information being larger than the threshold value for the judgment.

The subject region specification section 306i specifies, among the blocks B into which the reduced image of the subject existing image P1 is divided, a block/blocks B having the color unevenness quantity (variation) in the block/blocks B being more than a predetermined value, and specifies pixels of the specified block/blocks B having the difference information being more than the threshold value for the judgment, as the subject constituent region Cs (shown in FIG. 12B) (Step S103).

Alternatively, pixels having the difference information being more than the threshold value for the judgment may be specified as the subject constituent region Cs, and a block/blocks B having a large color unevenness quantity may be additionally specified as the subject constituent region Cs.

Next, the subject detection section 305 performs predetermined face detection processing on the YUV data of the subject existing image P1 so as to detect a face region (Step S104).

Next, the subject detection section 305 judges whether or not the detection of the face region is succeeded (Step S105). When it is judged that the detection of the face region is succeeded (Step S105; YES), the subject region specification section 306i additionally specifies the detected face region as the subject constituent region Cs (Step S106). It is not necessary for the subject region specification section 306i to specify the whole face region as the subject constituent region Cs. For example, the subject region specification section 306i may set a region which is smaller than the actually detected face region in a predetermined direction (the horizontal direction, for example) of the face region by a predetermined degree (percentage). Furthermore, the subject region specification section 306i may specify a region below the face region in the subject existing image P1 as the subject constituent region Cs.

On the other hand, when it is judged that the detection of the face region is not succeeded (Step S105; NO), the subject cutout section 306 skips Step S106, and ends the subject region specification processing.

Next, the subject extraction processing in the subject cutout processing is described with reference to FIGS. 13 to 15D.

Figure 13:
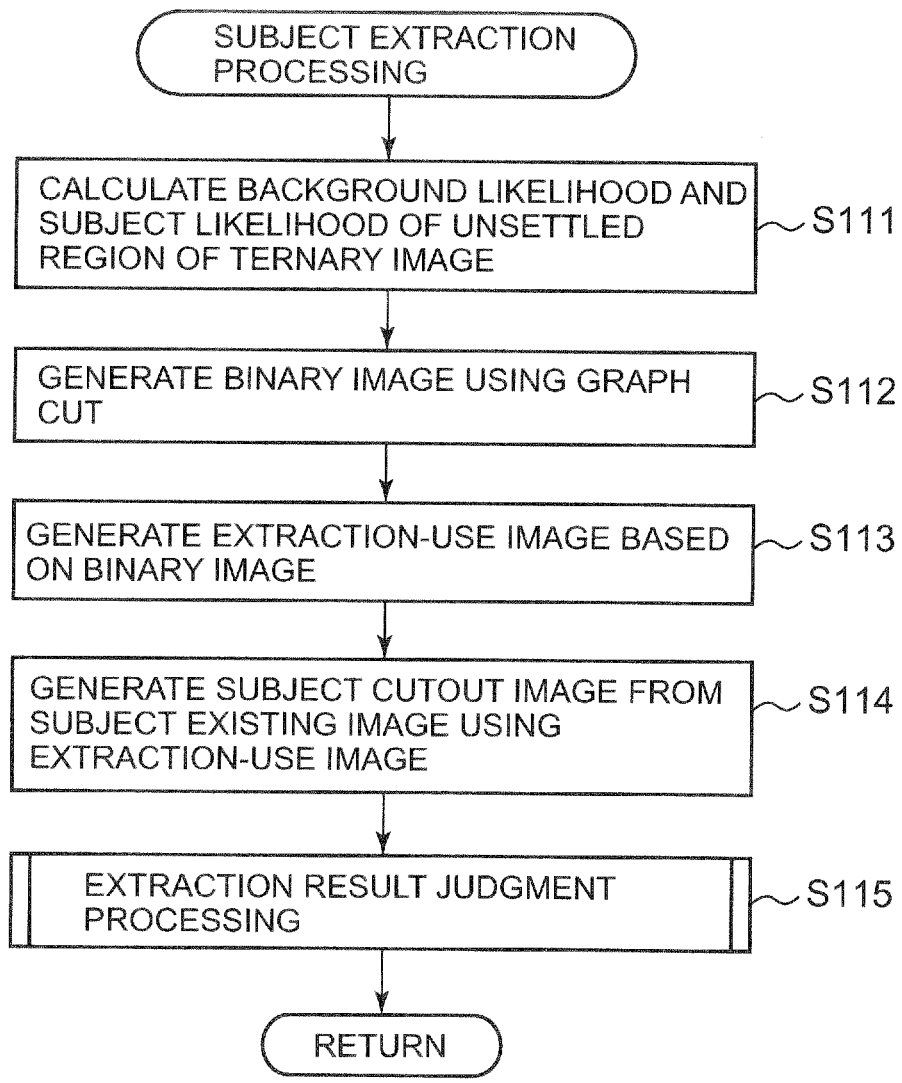
FIG. 13 is a flowchart showing subject extraction processing in the subject cutout processing shown in FIG. 6.
Figure 14:
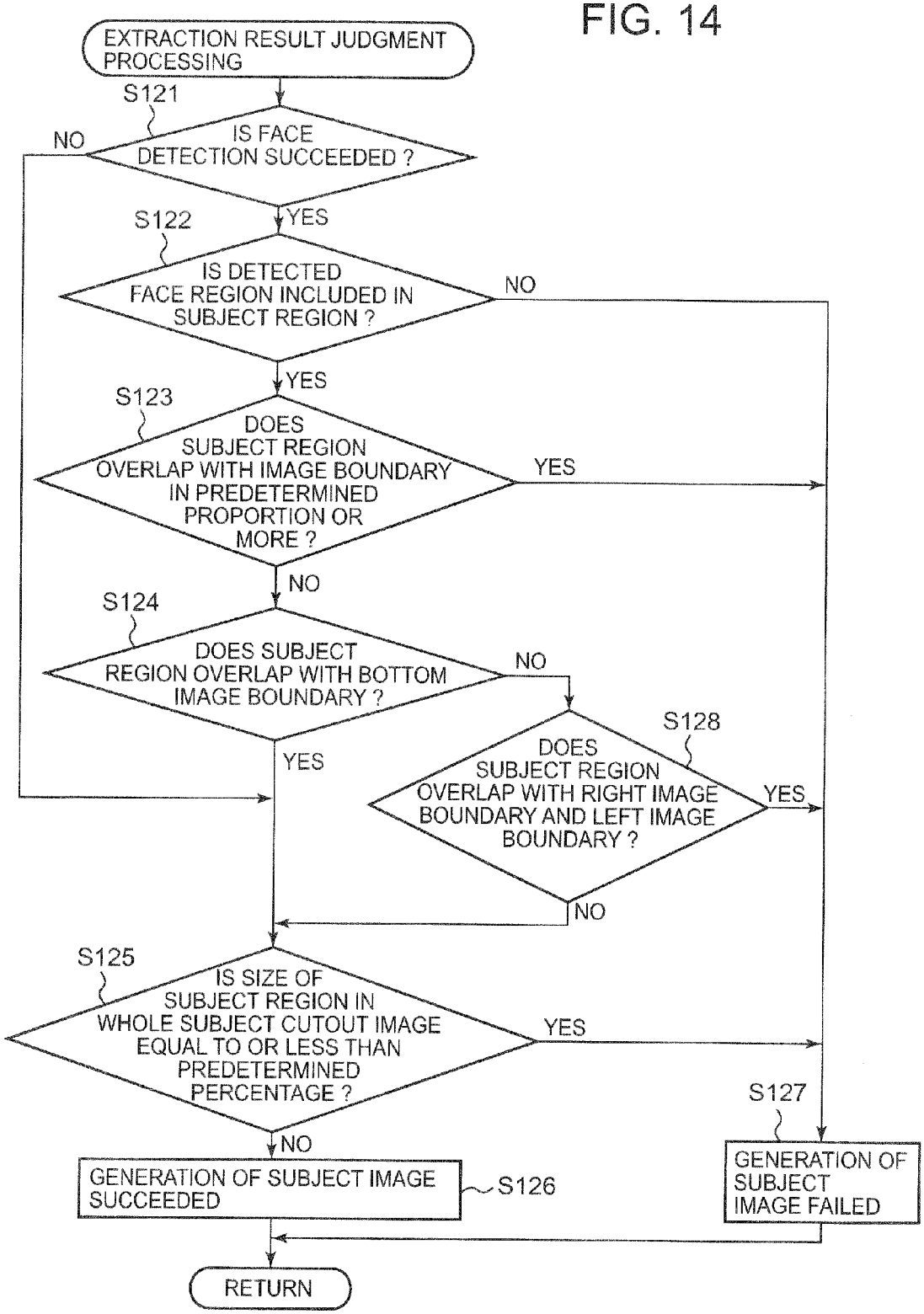
FIG. 14 is a flowchart showing extraction result judgment processing in the subject extraction processing shown in FIG. 13.

FIG. 13 is a flowchart showing the subject extraction processing. FIG. 14 is a flowchart showing the extraction result judgment processing in the subject extraction processing.

As shown in FIG. 13, the binary image generation section 306k of the subject extraction section 306j calculates the subject likelihood and the background likelihood of each pixel of the unsettled region Cu, which is undecided to be the subject or the background, in the ternary image P5 (shown in FIG. 15A) composed of the subject constituent region Cs, the background constituent region Cb, and the unsettled region Cu (Step S111).

More specifically, the binary image generation section 306k generates the ternary image P5 by regarding a region other than the subject constituent region Cs and the background constituent region Cb in the subject existing image P1 as the unsettled region Cu which is undecided to be the subject or the background, and setting the pixel value of the subject constituent region Cs to "1", the pixel value of the background constituent region Cb to "0", and the pixel value of the unsettled region Cu to "0.5", for example. Then, the binary image generation section 306k generates the Gaussian mixture model in accordance with color information (brightness information and color difference information) on regions respectively corresponding to the subject constituent region Cs and the background constituent region Cb of the subject existing image P1, and calculates the subject likelihood and the background likelihood of each pixel of the unsettled region Cu based on the Gaussian mixture model.

Next, the binary image generation section 306k generates the binary image in which the pixel value of the subject region D is "1", and the pixel value of the background region is "0", by utilizing the graph cut algorithm (Step S112).

More specifically, the binary image generation section 306k sets the subject constituent region Cs, the background constituent region Cb, and the subject likelihood and the background likelihood of each pixel of the unsettled region Cu to the data term of a predetermined energy function. In addition, the binary image generation section 306k sets a difference in color difference information between a pixel to its surrounding pixels (adjacent pixels, for example) of the unsettled region Cu to the smoothing term, with respect to each pixel of the unsettled region Cu. Then, the binary image generation section 306k calculates a parameter which minimizes the set energy function, and determines the pixel value of each pixel of the unsettled region Cu as the pixel value for the subject region D, namely, "1", or the pixel value for the background region, namely, "0".

Then, the subject extraction section 306j generates the extraction-use image (alpha map M, for example) which indicates the position of the subject region D in the subject existing image P1, based on the binary image generated by the binary image generation section 306k (Step S113).

More specifically, the subject extraction section 306j performs, for example, reduction processing on the binary image to eliminate regions in which differences caused by small noise or camera shake exist, thereby excluding pixel groups, the values of which are smaller than a predetermined value, and/or thin-line pixel groups produced by the camera shake. Then, the subject extraction section 306j performs labeling processing by which a same number is attached to pixels of a same connected component so as to produce a plurality of pixel groups, and performs enlargement processing by which the reduction by the reduction processing is corrected thereafter. Furthermore, the subject extraction section 306j performs the labeling processing inside the pixel group having the largest area (largest pixel group) specified as a subject part, and changes the pixel value of each pixel of an inside pixel group having a label percentage equal to or less than a predetermined percentage, the pixel value which is for a background region, to the pixel value for the subject part so as to replace the pixel group by the subject part, thereby performing filling-up processing. The label percentage expresses the number of background labels in the number of subject-part labels as percentage.

Thereafter, the subject extraction section 306j performs low-pass filtering on the binary image in which the pixel value of the largest pixel group corresponding to the subject part is "1", and the pixel value of the other part corresponding to the background region is "0", so as to produce an intermediate value at a border part therebetween, thereby creating a predetermined α value for each region, and generating the alpha map M (shown in FIG. 15B) accordingly.

Then, the subject extraction section 306j cuts out the subject region D from the subject existing image P1 by using the generated extraction-use image (alpha map M), and combines the cut-out subject region D with the predetermined one-color image P7 so as to generate the image data of the subject cutout image P6 (shown in FIG. 15C) (Step S114).

More specifically, the subject cutout section 306, with respect to each pixel of the subject existing image P1, allows the pixel having an α value of 0 to pass through the predetermined one-color image P7; blends the pixel having an α value of 0<α<1 with the predetermined one-color image P7; and does not perform anything on the pixel having an α value of 1, and does not allow the pixel having an α value of 1 to pass through the predetermined one-color image P7, accordingly. Gradations are given to the edge part of the alpha map M. Hence, the border part between the cut-out subject region D and the one-color image P7 (background) is vague and looks natural.

The image data of the generated subject cutout image P6 is correlated with the alpha map M, which is the extraction-use image, and stored in the storage section 302.

Next, the subject cutout section 306 performs the extraction result judgment processing (shown in FIG. 14) by which the result of the subject extraction processing is judged (Step S115).

The extraction result judgment processing is described with reference to FIG. 14.

As shown in FIG. 14, the subject cutout section 306 judges whether or not the face detection performed by the subject detection section 305 in the subject cutout processing is succeeded (Step S121).

When it is judged that the face detection is succeeded (Step S121; YES), the subject cutout section 306 judges whether or not the face region is included in the subject region D of the subject cutout image P6 (Step S122).

When it is judged that the face region is included in the subject region D (Step S122; YES), the subject cutout section 306 judges whether or not the subject region D overlaps with an image boundary of the subject cutout image P6 in a predetermined proportion or more (Step S123). More specifically, the subject cutout section 306 judges whether or not pixels of the subject region D, the pixels which are disposed on pixels of a predetermined image boundary (top image boundary, for example) of the subject cutout image P6, in all the pixels of the predetermined image boundary thereof is equal to or more than a predetermined percentage.

When it is judged that the subject region D does not overlap with the image boundary of the subject cutout image P6 in the predetermined proportion or more (Step S123; NO), the subject cutout section 306 judges whether or not the subject region D overlaps with the bottom image boundary of the subject cutout image P6 (Step S124).

When it is judged that the subject region D overlaps with the bottom image boundary of the subject cutout image P6 (Step S124; YES), the subject cutout section 306 judges whether or not the size of the subject region D in the whole subject cutout image P6 is equal to or less than a predetermined percentage (Step S125). More specifically, the subject cutout section 306 determines the number of all the pixels of the subject region D and the number of all the pixels of the subject cutout image P6, and judges whether or not the number of all the pixels of the subject region D in the number of all the pixels of the subject cutout image P6 is equal to or less than a predetermined percentage.

When it is judged that the size of the subject region D in the whole subject cutout image P6 is not equal to or less than the predetermined percentage (Step S125; NO), the subject cutout section 306 judges that the generation of the subject image is succeeded, and ends the extraction result judgment processing.

On the other hand, when it is judged that the size of the subject region D in the whole subject cutout image P6 is equal to or less than the predetermined percentage (Step S125; YES), the subject cutout section 306 judges that the generation of the subject image is failed (Step S127), and ends the extraction result judgment processing.

On the other hand, when it is judged that the subject region D does not overlap with the bottom image boundary of the subject cutout image P6 (Step S124; NO), the subject cutout section 306 judges whether or not the subject region D overlaps with the right and left image boundaries of the subject cutout image P6 (Step S128).

When it is judged that the subject region D does not overlap with the right and left image boundaries of the subject cutout image P6 (Step S128; NO), the subject cutout section 306 moves to Step S125, and judges whether or not the size of the subject region D in the whole subject cutout image P6 is equal to or less than the predetermined percentage (Step S125) as described above. On the other hand, when it is judged that the subject region D overlaps with the right and left image boundaries of the subject cutout image P6 (Step S128; YES), the subject cutout section 306 moves to Step S127, and judges that the generation of the subject image is failed (Step S127).

Also, when it is judged that the face detection is not succeeded (Step S121; NO), the subject cutout section 306 moves to Step S125, and does the same as described above (Step S125).

On the other hand, when it is judged that the face region is not included in the subject region D (Step S122; NO), or when it is judged that the subject region D overlaps with the image boundary of the subject cutout image P6 in the predetermined proportion or more (Step S123; YES), the subject cutout section 306 moves to Step S127, and judges that the generation of the subject image is failed (Step S127).

This ends the subject extraction processing.

As described above, according to the subject cutout system 100 of the first embodiment of the present invention, the extraction-use background image P4 is generated based on the similarity between the color of each image region A of the subject existing image P1 and the predetermined one color, the extraction-use background image P4 which is composed of the extraction-use background color for extracting the subject region D which includes the subject from the subject existing image P1. Accordingly, the extraction-use background color (extraction-use background image P4) can be appropriately generated by taking the color of each image region A of the subject existing image P1 into consideration. The image regions A are obtained by dividing the subject existing image P1, and specified. Accordingly, the image regions A for each of which the similarity between the color of its own and the predetermined one color is calculated can be appropriately specified.

Furthermore, the subject constituent region Cs and the background constituent region Cb are specified in the subject existing image P1 based on the generated extraction-use background color (extraction-use background image P4). Accordingly, it becomes unnecessary to specify the correct regions (seeds) constituting the subject and the background beforehand based on the predetermined user's operations of an operation section, and the subject constituent region Cs and the background constituent region Cb can be automatically specified.

More specifically, of the blocks B of the subject existing image P1, the color of the block B which is judged to have the similarity between the color of its own and the color of each of other blocks B being equal to or more than a predetermined judgment value the most number of times is estimated as the background color of the subject existing image P1. Accordingly, the background color (predetermined one color) of the subject existing image P1 which serves as a reference for the calculation of the similarity to the color of each image region A of the subject existing image P1 can be appropriately estimated.

Furthermore, because the block B which is judged to have the similarity between the color of its own and the color of each of other blocks B being equal to or more than a predetermined judgment value the most number of times is specified as the background constituent region Cb, the block B used for the estimation of the background color of the subject existing image P1 can be specified as the background constituent region Cb.

Furthermore, for each block B having the color unevenness quantity being equal to or less than a predetermined value, it is judged whether the pixel B has the similarity in the color to each of other blocks B being equal to or more than a predetermine judgment value. Accordingly, the background color (predetermined one color) of the subject existing image P1 can be estimated by using only the blocks B having a little color unevenness quantity among the blocks B of the subject existing image P1, and hence the background color thereof can be appropriately estimated.

Furthermore, when the extraction-use background image P4 is generated, for the region corresponding to the image region A which is judged to have the similarity between the color of its own and the predetermined one color being more than a predetermined judgment value, the extraction-use background image P4 can be generated based on the color of the image region A. On the other hand, for the region corresponding to the image region A which is judged to have the similarity between the color of its own and the predetermined one color being equal to or less than the predetermined judgment value, the extraction-use background image P4 can be generated based on the estimated background color of the subject existing image P1. Accordingly, the extraction-use background color (extraction-use background image P4) can be appropriately generated by taking the similarity between the color of each image region A of the subject existing image P1 and the predetermined one color into consideration.

Furthermore, the subject region D is extracted from the subject existing image P1 based on the subject constituent region Cs and the background constituent region Cb. Accordingly, the subject region D can be automatically extracted from the subject existing image P1 by simply obtaining the subject existing image P1.

Second Embodiment

Figure 16:
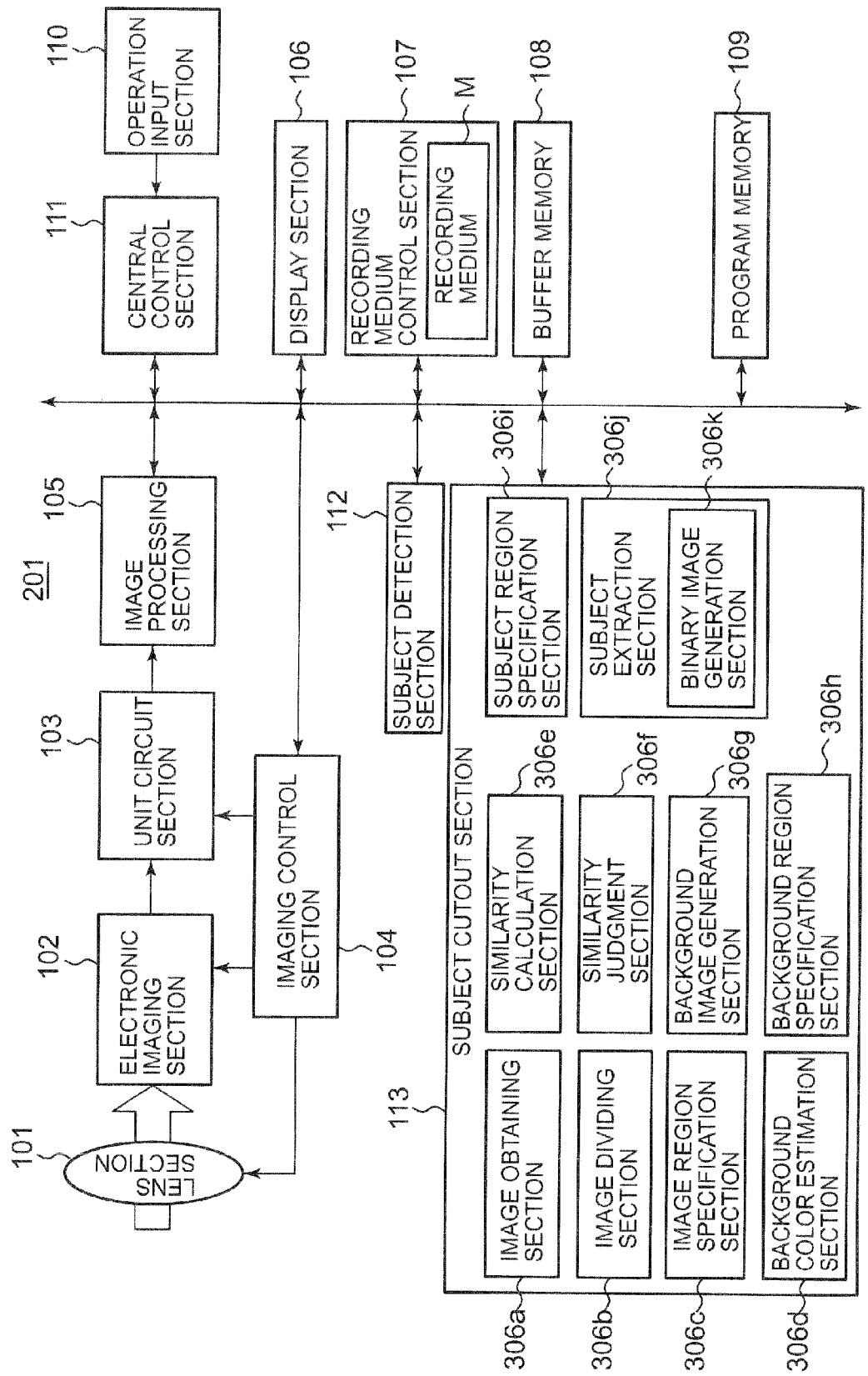
FIG. 16 is a block diagram schematically showing the configuration of an imaging apparatus according to a second embodiment of the present invention.

FIG. 16 is a block diagram schematically showing the configuration of an imaging apparatus 201 according to a second embodiment of the present invention.

The imaging apparatus 201 of the second embodiment is almost the same as the imaging apparatus 1 of the first embodiment in configuration except for the points described in detail below, and hence the description of the similar configuration is omitted.

The imaging apparatus 201 of the second embodiment as an image processing apparatus calculates the similarity between a color of each image region A of a subject existing image P1 and a predetermined one color, the subject existing image P1 in which a subject and a background coexist, and generates an extraction-use background image P4 for extracting a subject region D which includes the subject from the subject existing image P1 based on the calculated similarity. Then, the imaging apparatus 201 specifies a subject constituent region Cs which constitutes the subject and a background constituent region Cb which constitutes the background in the subject existing image P1 based on the generated extraction-use background image P4.

As shown in FIG. 16, the imaging apparatus 201 includes the same components as the imaging apparatus 1 of the first embodiment, namely, the lens section 101, the electronic imaging section 102, the unit circuit section 103, the imaging control section 104, the image processing section 105, the display section 106, the recording medium control section 107, the buffer memory 108, the program memory 109, the operation input section 110, and the central control section 111. In addition, the imaging apparatus 201 includes a subject detection section 112 and a subject cutout section 113.

The subject detection section 112 and the subject cutout section 113 have similar functions to the subject detection section 305 and the subject cutout section 306 of the server 3 of the first embodiment.

That is, a similarity calculation section 306e of the subject cutout section 113 calculates the similarity between the color of each image region A of the subject existing image P1 and the predetermined one color, the subject existing image P1 in which the subject and the background coexist. A background image generation section 306g of the subject cutout section 113 generates the extraction-use background image P4 for extracting the subject region D which includes the subject from the subject existing image P1 based on the calculated similarity. A background region specification section 306h and a subject region specification section 306i of the subject cutout section 113 respectively specify the background constituent region Cb constituting the background and the subject constituent region Cs constituting the subject in the subject existing image P1 based on the generated extraction-use background image P4.

The subject detection section 112 detects a certain subject from the subject existing image P1.

The imaging apparatus 201 performs subject cutout processing similar to the subject cutout processing (shown in FIG. 6) of the first embodiment, so as to cut out the subject region D from the subject existing image P1, and generate image data of a subject cutout image P6.

Therefore, according to the imaging apparatus 201 of the second embodiment, like the first embodiment, the extraction-use background image P4 is generated based on the similarity between the color of each image region A of the subject existing image P1 and the predetermined one color, the extraction-use background image P4 which is composed of an extraction-use background color for extracting the subject region D which includes the subject from the subject existing image P1. Accordingly, the extraction-use background color (extraction-use background image P4) can be appropriately generated by taking the color of each image region A of the subject existing image P1 into consideration. Furthermore, the subject constituent region Cs and the background constituent region Cb are specified in the subject existing image P1 based on the generated extraction-use background color (extraction-use background image P4). Accordingly, it becomes unnecessary to specify the correct regions (seeds) constituting the subject and the background beforehand based on the predetermined user's operations of an operation section, and the subject constituent region Cs and the background constituent region Cb can be automatically specified.

The subject detection section 305 and 112 in the first embodiment and the second embodiment are not always necessary to be provided, and whether or not to provide the subject detection section 305 or 112 can be appropriately decided.

The present invention is not limited to the first embodiment and the second embodiment described above, and hence various modifications and design changes can be made without departing from the scope of the spirit of the present invention.

For example, in the first embodiment and the second embodiment, the subject cutout section 306 or 113 includes the image dividing section 306b, the background color estimation section 306d, and the subject extraction section 306j. However, whether or not to provide the image dividing section 306b, the background color estimation section 306d, and/or the subject extraction section 306j can be appropriately decided.

Furthermore, in the first embodiment and the second embodiment, the subject cutout section 306 or 113 includes the similarity judgment section 306f, and generates the extraction-use background image P4 by taking the judgment result made by the similarity judgment section 306f into consideration. However, whether or not to provide the similarity judgment section 306f, namely whether or not to generate the extraction-use background image P4 by taking the judgment result made by the similarity judgment section 306f into consideration, can be appropriately decided.

Furthermore, in the first embodiment and the second embodiment, the extraction result judgment processing is performed in the subject extraction processing. However, whether or not to perform the extraction result judgment processing can be appropriately decided. In addition, the steps of the extraction result judgment processing shown in FIG. 14 are not a limit but an example, and hence can be appropriately changed.

Furthermore, in the first embodiment, the server (image processing apparatus) 3 which works as a web server specifies the subject constituent region Cs and the background constituent region Cb based on the predetermined user's operations of the user terminal 2. However, this is not a limit but an example, and hence the configuration of the image processing apparatus can be appropriately changed. That is, the functions of the subject cutout section 306 or 113 associated with the generation of the extraction-use image may be realized by software, and the software may be installed in the user terminal 2. Accordingly, the subject image generation processing may be performed by the user terminal 2 by itself without the communication network N.

In other words, the user terminal 2 may be configured to calculate the similarity between a color of each image region A of the subject existing image P1 and a predetermined one color, the subject existing image P1 in which a subject and a background coexist; generate the extraction-use background image P4 for extracting the subject region D which includes the subject from the subject existing image P1 based on the calculated similarity; and specify the subject constituent region Cs constituting the subject and the background constituent region Cb constituting the background in the subject existing image P1 based on the generated extraction-use background image P4.

Furthermore, in the first embodiment, a personal computer is used as the user terminal 2. However, this is not a limit but an example, and hence another element may be appropriately used as the user terminal 2. For example, a mobile phone or the like may be used.

Furthermore, in the first embodiment, the subject cutout system 100 may include a printing apparatus, and the printing apparatus may print the subject image of the subject cutout image P6 generated by the server 3 on a predetermined printing base material by a predetermined printing method so as to create print of the subject image. Furthermore, the server 3 may combine the generated subject cutout image P6 with a predetermined background image by using an alpha map M so as to generate a subject combined image (not shown). In this case, the printing apparatus may create print of the subject combined image.

Control information on prohibition of predetermined changes by a user may be embedded in the image data of the subject cutout image P6 or the subject combined image.

Furthermore, in the first embodiment and the second embodiment, functions as an obtaining section, a first specification section, a comparison section, a generation section, and a second specification section are realized by the image obtaining section 306a, the image region specification section 306c, the similarity calculation section 306e, the background image generation section 306g, the background region specification section 306h, and the subject region specification section 306i of the subject cutout section 306 or 113 being driven under the control of the central control section 301 of the server 3 or the central control section 111 of the imaging apparatus 201. However, this is not a limit. The functions may be realized by the CPU of the central control section 301 or 111 executing a predetermined program or the like.

That is, a program including an obtaining processing routine, a first specification processing routine, a comparison processing routine, a generation processing routine, and a second specification processing routine may be stored in a program memory (not shown) which stores programs. Then, the obtaining processing routine may make the CPU of the central control section 301 or 111 function as the obtaining section which obtains the subject existing image P1 in which the subject and the background coexist. Furthermore, the first specification processing routine may make the CPU of the central control section 301 or 111 function as the first specification section which specifies a plurality of image regions A in the subject existing image P1 obtained by the obtaining section. Furthermore, the comparison processing routine may make the CPU of the central control section 301 or 111 function as the comparison section which compares the representative color of each image region A specified by the first specification section and a predetermined one color. Furthermore, the generation processing routine may make the CPU of the central control section 301 or 111 function as the generation section which generates the extraction-use background color for extracting the subject region D which includes the subject from the subject existing image P1 based on the result of the comparison made by the comparison section. Furthermore, the second specification processing routine may make the CPU of the central control section 301 or 111 function as the second specification section which specifies the subject constituent region Cs constituting the subject and the background constituent region Cb constituting the background in the subject existing image P1 based on the extraction-use background color generated by the generation section.

Similarly, functions as a dividing section, an estimation section, a judgment section, and an extraction section may also be realized by the CPU of the central control section 301 of the server 3 or the CPU of the central control section 111 of the imaging apparatus 201 executing a predetermined program or the like.

Furthermore, as a computer readable medium to store the program to perform each processing described above, other than a ROM and a hard disk, a nonvolatile memory such as a flash memory and a portable recording medium such as a CD-ROM can be used. Furthermore, as a medium to provide data of the program via a predetermined communication line, a carrier wave can be used.

This application is based upon and claims the benefit of priority under 35 USC 119 of Japanese Patent Application No. 2010-285315 filed on Dec. 22, 2010, the entire disclosure of which, including the description, claims, drawings, and abstract, is incorporated herein by reference in its entirety.

What is claimed is:

1. An image processing apparatus comprising:
    an obtaining section which obtains a subject existing image in which a subject and a background exist;
    a first specification section which specifies a plurality of image regions in the subject existing image;
    an estimation section which estimates a background color of the subject existing image, wherein the estimation section judges, for each of a plurality of blocks of the subject existing image, whether or not a given block of the blocks has a similarity in representative color to another block of the blocks that is equal to or more than a predetermined judgment value, and estimates the representative color of the given block as the estimated background color when the given block is judged to have the similarity in the representative color a most number of times among all of the blocks;
    a comparison section which compares a representative color of each of the image regions with a predetermined color, wherein the comparison section uses the estimated background color as the predetermined color, and calculates, for each of the image regions specified by the first specification section, a similarity between the representative color of the image region and the estimated background color;
    a generation section which generates an extraction-use background color based on a comparison result of the comparison section; and
    a second specification section which specifies a subject constituent region constituting the subject and a background constituent region constituting the background in the subject existing image based on the extraction-use background color.

2. The image processing apparatus according to claim 1, further comprising:
    a dividing section which divides the subject existing image into the image regions,
    wherein the first specification section specifies the image regions into which the subject existing image is divided by the dividing section.

3. The image processing apparatus according to claim 1, wherein the second specification section specifies as the background constituent region an area including the given block that is judged to have the similarity in the representative color the most number of times.

4. The image processing apparatus according to claim 1, wherein the estimation section calculates a color unevenness quantity of each of the blocks of the subject existing image and operates with respect to blocks having a color unevenness quantity that is equal to or less than a predetermined value.

5. The image processing apparatus according to claim 1, further comprising:
    a judgment section which judges, for each of the image regions, whether or not the similarity calculated by the comparison section is more than another predetermined judgment value,
    wherein when the judgment section judges that the similarity is more than said another predetermined judgment value, the generating section generates the extraction-use background color based on the representative color for a region corresponding to the image region, and when the judgment section judges that the similarity is equal to or less than said another predetermined judgment value, the generating section generates the extraction-use background color based on the estimated background color for a region corresponding to the image region.

6. The image processing apparatus according to claim 1, further comprising:
an extraction section which extracts a subject region including the subject from the subject existing image based on the subject constituent region and the background constituent region specified by the second specification section.

7. An image processing method using an image processing apparatus which comprises a processor, the image processing method comprising:
obtaining, with the processor, a subject existing image in which a subject and a background exist;
specifying, with the processor, a plurality of image regions in the obtained subject existing image;
estimating, with the processor, a background color of the subject existing image, wherein the estimating comprises judging, for each of a plurality of blocks of the subject existing image, whether or not a given block of the blocks has a similarity in representative color to another block of the blocks that is equal to or more than a predetermined judgment value, and estimating the representative color of the given block as the estimated background color when the given block is judged to have the similarity in the representative color a most number of times from among all of the blocks;
comparing, with the processor, a representative color of each of the specified image regions with a predetermined color, wherein the estimated background color is used as the predetermined color, and the comparing comprises calculating, for each of the specified image regions, a similarity between the representative color of the image region and the estimated background color;
generating, with the processor, an extraction-use background color based on a comparison result of the comparison; and
specifying, with the processor, a subject constituent region constituting the subject and a background constituent region constituting the background in the subject existing image based on the generated extraction-use background color.

8. A non-transitory computer-readable recording medium having recorded thereon a program that is executable by a computer of an image processing apparatus to cause the computer to function as elements comprising:
an obtaining section which obtains a subject existing image in which a subject and a background exist;
a first specification section which specifies a plurality of image regions in the subject existing image;
an estimation section which estimates a background color of the subject existing image, wherein the estimation section judges, for each of a plurality of blocks of the subject existing image, whether or not a given block of the blocks has a similarity in representative color to another block of the blocks that is equal to or more than a predetermined judgment value, and estimates the representative color of the given block as the estimated background color when the given block is judged to have the similarity in the representative color a most number of times from among all of the blocks;
a comparison section which compares a representative color of each of the image regions with a predetermined color, wherein the comparison section uses the estimated background color as the predetermined color, and calculates, for each of the image regions specified by the first specification section, a similarity between the representative color of the image region and the estimated background color;
a generation section which generates an extraction-use background color based on a comparison result of the comparison section; and
a second specification section which specifies a subject constituent region constituting the subject and a background constituent region constituting the background in the subject existing image based on the extraction-use background color.

9. An image processing apparatus comprising:
an obtaining section which obtains a subject existing image in which a subject and a background exist;
a first specification section which specifies a plurality of image regions in the subject existing image;
an estimation section which estimates a background color of the subject existing image;
a comparison section which compares a representative color of each of the image regions with a predetermined color, wherein the comparison section uses the estimated background color as the predetermined color, and calculates, for each of the image regions specified by the first specification section, a similarity between the representative color of the image region and the estimated background color;
a judgment section which judges, for each of the image regions, whether or not the similarity calculated by the comparison section is more than a predetermined judgment value;
a generation section which generates an extraction-use background color based on a comparison result of the comparison section, wherein when the judgment section judges that the similarity is more than the predetermined judgment value, the generating section generates the extraction-use background color based on the representative color for a region corresponding to the image region, and when the judgment section judges that the similarity is equal to or less than the predetermined judgment value, the generating section generates the extraction-use background color based on the estimated background color for a region corresponding to the image region; and
a second specification section which specifies a subject constituent region constituting the subject and a background constituent region constituting the background in the subject existing image based on the extraction-use background color.

10. The image processing apparatus according to claim 9, further comprising:
a dividing section which divides the subject existing image into the image regions,
wherein the first specification section specifies the image regions into which the subject existing image is divided by the dividing section.

11. The image processing apparatus according to claim 9, further comprising:
an extraction section which extracts a subject region including the subject from the subject existing image based on the subject constituent region and the background constituent region specified by the second specification section.

12. An image processing method using an image processing apparatus which comprises a processor, the image processing method comprising:
obtaining, with the processor, a subject existing image in which a subject and a background exist;

specifying, with the processor, a plurality of image regions in the obtained subject existing image;

estimating, with the processor, a background color of the subject existing image;

comparing, with the processor, a representative color of each of the specified image regions with a predetermined color, wherein the estimated background color is used as the predetermined color, and the comparing comprises calculating, for each of the specified image regions, a similarity between the representative color of the image region and the estimated background color;

judging, with the processor, for each of the image regions, whether or not the calculated similarity is more than a predetermined judgment value;

generating, with the processor, an extraction-use background color based on a comparison result of the comparison, wherein when it is judged that the similarity is more than the predetermined judgment value, the extraction-use background color is generated based on the representative color for a region corresponding to the image region, and when it is judged that the similarity is equal to or less than the predetermined judgment value, the extraction-use background color is generated based on the estimated background color for a region corresponding to the image region; and specifying, with the processor, a subject constituent region constituting the subject and a background constituent region constituting the background in the subject existing image based on the generated extraction-use background color.

13. A non-transitory computer-readable recording medium having recorded thereon a program that is executable by a computer of an image processing apparatus to cause the computer to function as elements comprising:

an obtaining section which obtains a subject existing image in which a subject and a background exist;

a first specification section which specifies a plurality of image regions in the subject existing image;

an estimation section which estimates a background color of the subject existing image;

a comparison section which compares a representative color of each of the image regions with a predetermined color, wherein the comparison section uses the estimated background color as the predetermined color, and calculates, for each of the image regions specified by the first specification section, a similarity between the representative color of the image region and the estimated background color;

a judgment section which judges, for each of the image regions, whether or not the similarity calculated by the comparison section is more than a predetermined judgment value;

a generation section which generates an extraction-use background color based on a comparison result of the comparison section, wherein when the judgment section judges that the similarity is more than the predetermined judgment value, the generating section generates the extraction-use background color based on the representative color for a region corresponding to the image region, and when the judgment section judges that the similarity is equal to or less than the predetermined judgment value, the generating section generates the extraction-use background color based on the estimated background color for a region corresponding to the image region; and a second specification section which specifies a subject constituent region constituting the subject and a background constituent region constituting the background in the subject existing image based on the extraction-use background color.

* * * * *